US011655862B2

(12) United States Patent
Dohi et al.

(10) Patent No.: US 11,655,862 B2
(45) Date of Patent: May 23, 2023

(54) ROTATION TRANSMISSION STATE SWITCHING DEVICE

(71) Applicant: NSK Ltd., Tokyo (JP)

(72) Inventors: Nagao Dohi, Fujisawa (JP); Eiji Inoue, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/911,045

(22) PCT Filed: Jun. 15, 2021

(86) PCT No.: PCT/JP2021/022694
§ 371 (c)(1),
(2) Date: Sep. 12, 2022

(87) PCT Pub. No.: WO2022/044496
PCT Pub. Date: Mar. 3, 2022

(65) Prior Publication Data
US 2023/0100550 A1   Mar. 30, 2023

(30) Foreign Application Priority Data

Aug. 31, 2020  (JP) .............................. JP2020-145531

(51) Int. Cl.
*F16D 41/10* (2006.01)
*F16D 13/16* (2006.01)

(52) U.S. Cl.
CPC .............. *F16D 41/10* (2013.01); *F16D 13/16* (2013.01)

(58) Field of Classification Search
CPC ........ F16D 41/08; F16D 41/082; F16D 41/10; F16D 13/16; F16D 13/18
See application file for complete search history.

(56) References Cited

U.S. PATENT DOCUMENTS 3,971,462 A * 7/1976 Johansson ............... F16D 43/18
192/17 R
5,821,653 A   10/1998 Kinto et al.
(Continued)

FOREIGN PATENT DOCUMENTS

JP       9-226394 A    9/1997
JP    2009-078598 A    4/2009
(Continued)

OTHER PUBLICATIONS

Notice of Reasons for Refusal of JR 2021-570156 dated Mar. 1, 2022.
(Continued)

*Primary Examiner* — Huan Le
(74) *Attorney, Agent, or Firm* — Sughrue Mion, PLLC

(57) ABSTRACT

The rotation transmission state switching device comprises a clutch device comprising a first rotating member having a first-rotating-member-side engaging portion, a second rotating member having a second-rotating-member-side engaging portion, a third rotating member having a third-rotating-member-side engaging portion; and an engaging element having an engaging-element-side first engaging portion engaging with the first-rotating-member-side engaging portion, an engaging-element-side second engaging portion engaging with the second-rotating-member-side engaging portion, and an engaging-element-side third engaging portion engaging with the third-rotating-member-side engaging portion; and a restriction device configured to switch between allowing and restricting rotation of the first rotating member, allowing or preventing torque transmission between the second rotating member and the third rotating member.

8 Claims, 28 Drawing Sheets

(56) References Cited

U.S. PATENT DOCUMENTS

| | | | |
|---|---|---|---|
| 6,257,388 B1* | 7/2001 | Cronin | F16D 51/18 |
| | | | 188/134 |
| 9,455,607 B2* | 9/2016 | Mizutani | F16D 43/02 |
| 10,704,610 B2* | 7/2020 | Chino | F16D 41/06 |

FOREIGN PATENT DOCUMENTS

| | | |
|---|---|---|
| JP | 2016-114232 A | 6/2016 |
| JP | 2019-027488 A | 2/2019 |
| JP | 2019-214240 A | 12/2019 |

OTHER PUBLICATIONS

International Search Report of PCT/JP2021/022694 dated Aug. 17, 2021 [PCT/ISA/210].

* cited by examiner

ROTATION TRANSMISSION STATE SWITCHING DEVICE

CROSS REFERENCE TO RELATED APPLICATIONS

This application is a National Stage of International Application No. PCT/JP2021/022694, filed Jun. 15, 2021, claiming priority to Japanese Patent Application No. 2020-145531, filed Aug. 31, 2020.

TECHNICAL FIELD

The present invention relates to a transmission state switching device that is, for example, incorporated between a drive source and a rotating shaft in order to perform switching so that it is possible or not possible to transmit torque between the drive source and the rotating shaft.

BACKGROUND ART

In response to the trend of consumption reduction of fossil fuel in recent years, research on electric automobiles has progressed, and the electric automobiles have been partially implemented. As described in JP H09-226394 (A), for example, a drive unit for electric automobiles includes an electric motor, a gear type speed-reduction mechanism, and a differential gear. When the electric motor is electrically energized to rotate an output shaft of the electric motor, rotation torque of the output shaft is increased by the speed-reduction mechanism, and then is transmitted to the differential gear. Then, the rotation torque is distributed to left and right drive wheels by the differential gear.

CITATION LIST

Patent Literature

[Patent Literature 1] JP H09-226394 (A)

SUMMARY OF INVENTION

Technical Problem

The drive unit for electric automobiles described in JP H09-226394 (A) has room for improvement from the following aspects. For example, when a hybrid automobile in which this drive unit for electric automobiles is incorporated is traveling only by an engine while the electric motor is stopped, rotation of drive wheels is applied to the output shaft of the electric motor with the speed of the rotation increased by the speed-reduction mechanism. Due to this, it is possible to cause such a problem that the electric motor functions as an electric generator, and thus an excessive reverse electromotive voltage is applied to a drive circuit of the electric motor.

In order to solve problems as described above, it is considered that by providing a clutch between the electric motor and the drive wheels in a drive system, when the electric motor is stopped, the electric motor and the drive wheels will be separated so as to prevent torque from being transmitted between the drive wheels and the electric motor. However, in this case, because the clutch needs an actuator for switching between a connection state and a disconnection state between the electric motor and the drive wheels while the electric motor and the drive wheels remain rotating, there is a possibility that the structure of the device and control of connection and disconnection of the clutch are complicated. In addition, there is a possibility that a shock caused by connection of the clutch gives a driver a sense of incongruity and an unpleasant feeling.

In view of the circumstances described above, an object of the present invention is to provide a rotation transmission state switching device having a more simplified configuration.

Solution to Problem

A rotation transmission state switching device of one aspect of the present invention includes a clutch device and a restriction device.

The Clutch Device Includes a first rotating member having a first-rotating-member-side engaging portion, a second rotating member having a second-rotating-member-side engaging portion, a third rotating member having a third-rotating-member-side engaging portion, and an engaging element having an engaging-element-side first engaging portion that engages with the first-rotating-member-side engaging portion, an engaging-element-side second engaging portion that engages with the second-rotating-member-side engaging portion, and an engaging-element-side third engaging portion that engages with the third-rotating-member-side engaging portion.

The restriction device is configured so as to be able to switch between a state where rotation of the first rotating member is allowed and a state where rotation of the first rotating member is restricted.

In the rotation transmission state switching device of one aspect of the present invention, the restriction device may be configured by a braking device that is provided between a fixed portion that does not rotate even in use and the first rotating member, and that switches between a state where rotation of the first rotating member with respect to the fixed portion is allowed and a state where rotation of the first rotating member with respect to the fixed portion is prevented.

Alternatively, the restriction device may be configured by an electric motor.

In the rotation transmission state switching device of one aspect of the present invention, torque transmission between the second rotating member and the third rotating member is allowed when rotation of the first rotating member is allowed by the restriction device, whereas torque transmission between the second rotating member and the third rotating member is not possible when rotation of the first rotating member is prevented by the restriction device.

The clutch device may include a biasing member configured to elastically bias the engaging element in a direction in which the third-rotating-member-side engaging portion and the engaging-element-side third engaging portion engage with each other.

The third rotating member may have the third-rotating-member-side engaging portion on an inner circumferential surface thereof. In this case, the engaging element has the engaging-element-side second engaging portion on an inner side surface in a radial direction thereof, and has the engaging-element-side third engaging portion on an outer side surface in the radial direction thereof. Furthermore, the first-rotating-member-side engaging portion is arranged on the inside in the radial direction of the third-rotating-member-side engaging portion, and the second-rotating-memberside engaging portion is arranged on the inside in the radial direction of the third-rotating-member-side engaging portion.

In this case, the engaging element may be configured by a pair of engaging elements that is arranged so as to sandwich the second-rotating-member-side engaging portion by inner side surfaces in the radial direction thereof from outsides in the radial direction.

The Engaging Element May Include an engaging element main body having the engaging-element-side second engaging portion, the engaging-element-side third engaging portion, and a swinging support portion that is positioned closer to the third-rotating-member-side engaging portion than the engaging-element-side first engaging portion with respect to a direction of movement of the engaging-element-side third engaging portion toward or away from the third-rotating-member-side engaging portion, and a link member having the engaging-element-side first engaging portion, and a swinging supported member that is supported by the swinging support portion so as to be able to swing.

The engaging element main body may include a pair of main body plates that has plate-side engaging portions configuring the engaging-element-side second engaging portion, the pair of main body plates being arranged so as to overlap each other with respect to an axial direction of the third-rotating-member-side engaging portion, and being connected to each other, and a swinging support shaft that constitutes the swinging support portion, the swinging support shaft being supported by the pair of main body plates on both side portions in the axial direction thereof.

In this case, the link member may be arranged between the pair of main body plates.

The engaging element main body may include an intermediate plate that is sandwiched and held between the pair of main body plates.

The third rotating member may have a torque input/output portion on an outer circumferential surface thereof, the torque input/output portion being configured to input and/or output torque between an output shaft of a drive source such as an electric motor and an engine and a rotating shaft. The torque input/output portion may be configured, for example, by a gear portion in which recess portions and convex portions are alternately arranged on an entire circumference thereof so as to mesh with a gear, a pulley portion for laying a belt across, or a sprocket portion for laying a chain across.

The rotation transmission state switching device of one aspect of the present invention may be used by being incorporated in a drive system in which rotation torque of the drive source is transmitted to a drive wheel.

Effect of Invention

By one aspect of the present invention, provided is a rotation transmission state switching device having a more simplified structure by which a manufacture cost can be suppressed low.

BRIEF DESCRIPTION OF DRAWINGS

FIG. 20(A)(b) is a view illustrating the engagement part in a state after rotational torque is inputted to the third rotating member of the neutral state illustrated in FIG. 20(A)(a).

FIG. 20(B)(b) is a view illustrating the engagement part in a state after rotational torque is inputted to the third rotating member of the neutral state illustrated in FIG. 20(B)(a).

DESCRIPTION OF EMBODIMENTS

First Example

A first example of an embodiment of the present invention will be described with reference to FIGS. 1 to 21(B). In the following description, a rotation transmission state switching device of this example is incorporated in a drive system for automobiles. However, applications of the rotation transmission state switching device of the present invention are not limited thereto.

Figure 1:
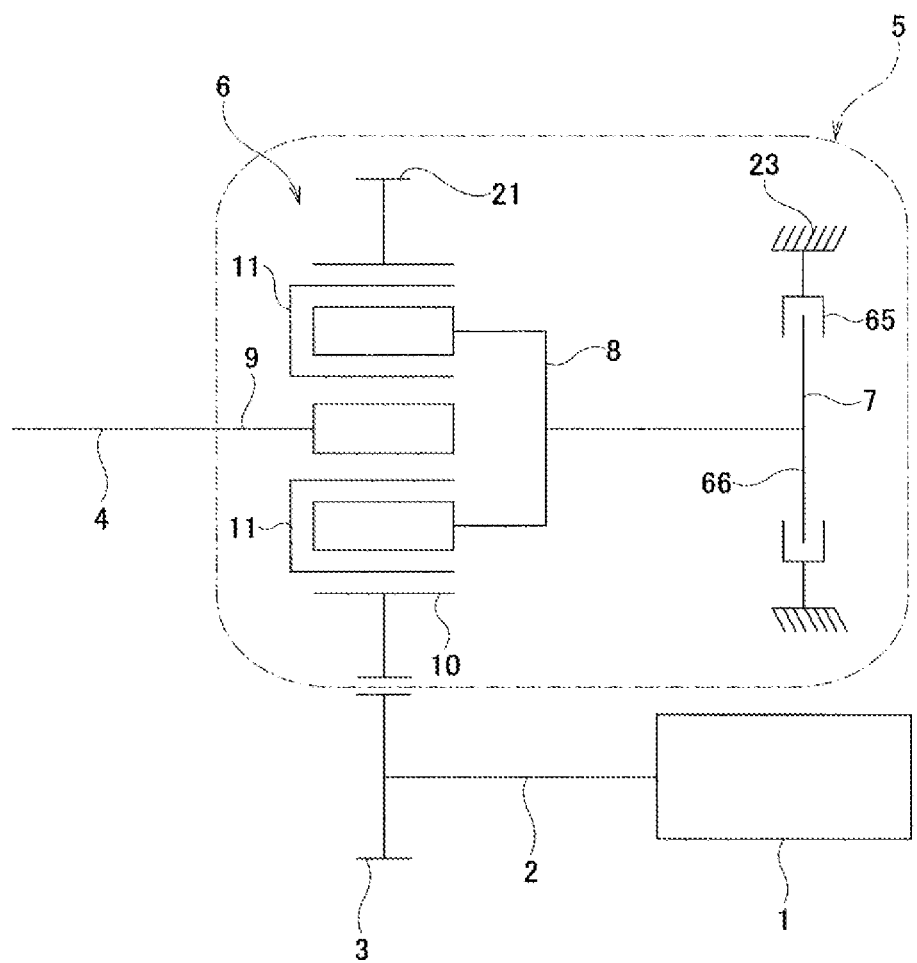
FIG. 1 is a schematic view illustrating a drive system for automobiles in which a rotation transmission state switching device of a first example of an embodiment of the present invention is incorporated.

As illustrated in FIG. 1, in automobiles, output torque of a drive source 1 is transmitted to drive wheels (not shown) through a torque transmission member such as a differential gear. The drive source 1 is configured by an engine and/or an electric motor. The drive source 1 has an output shaft 2, and a drive-side gear 3 provided in the tip-end portion of the output shaft 2.

The drive system for automobiles of this example includes the drive source 1, a rotating shaft 4 connected to the drive wheels so that torque transmission is possible, and a rotation transmission state switching device 5 disposed between the drive source 1 and the rotating shaft 4. The rotation transmission state switching device 5 of this example has a function to perform switching so that it is possible or not possible to transmit torque between the drive source 1 and the rotating shaft 4, and includes a clutch device 6, and a braking device 7 as a restriction device.

Figure 2:
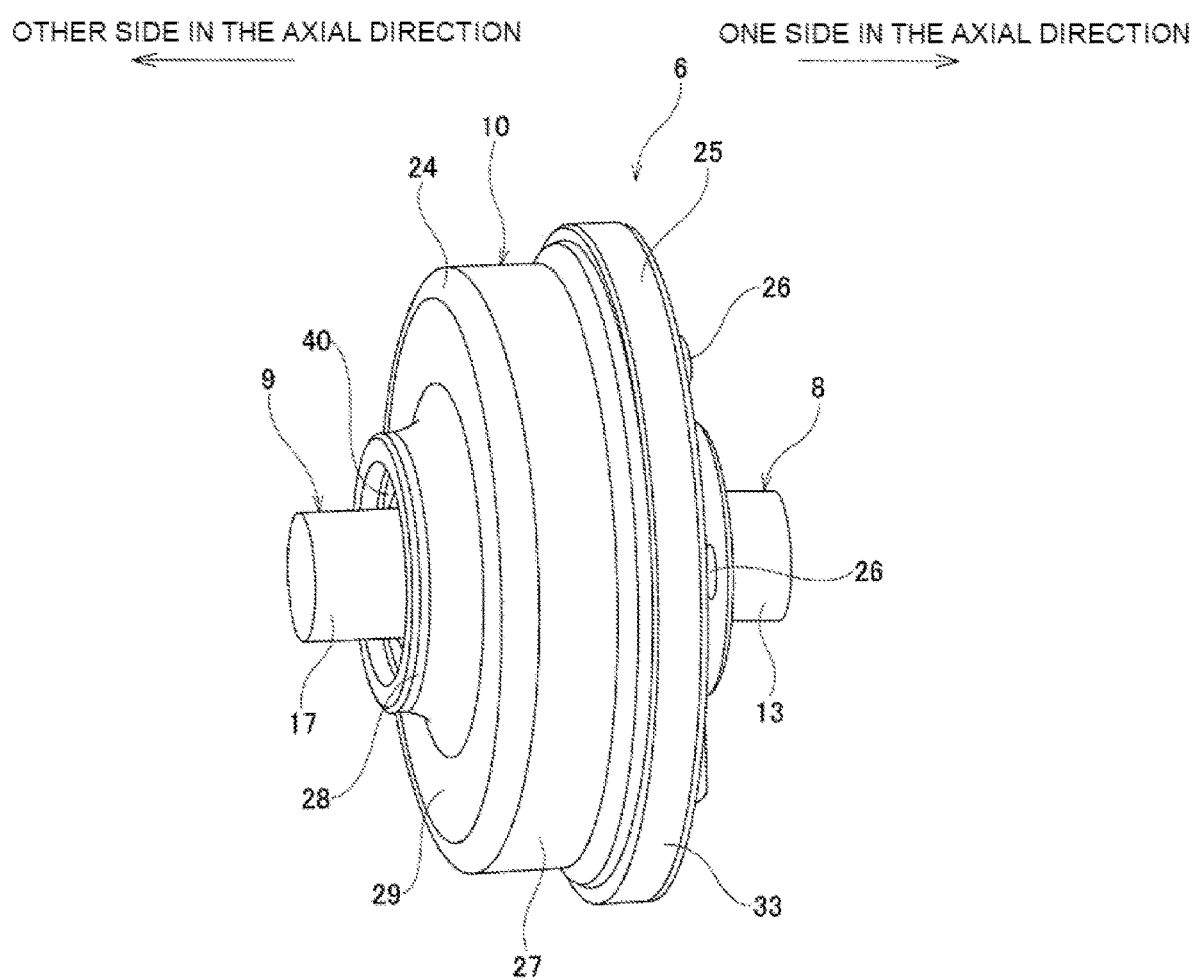
FIG. 2 is a perspective view of a clutch device of the rotation transmission state switching device of the first example.
Figure 3:
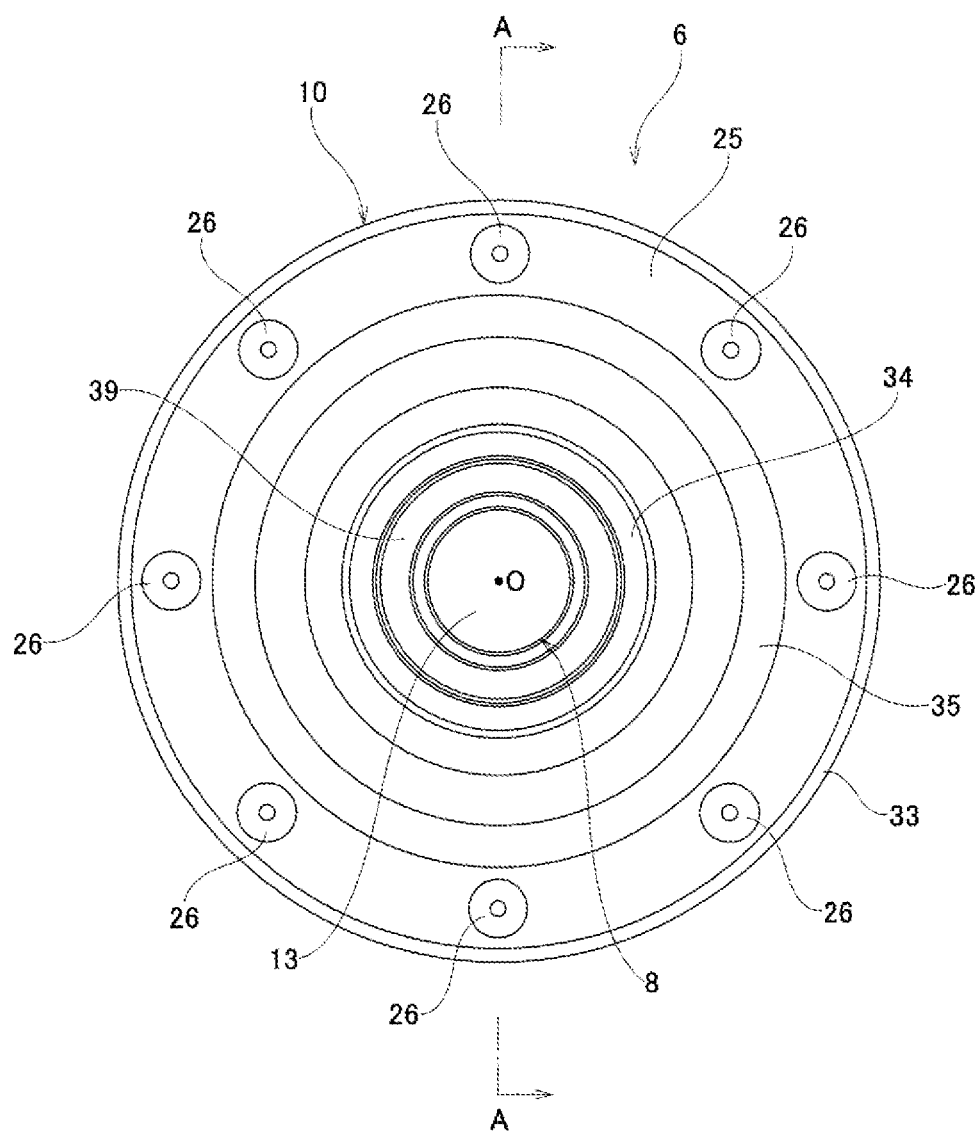
FIG. 3 is an end view as viewed from the right side of FIG. 2.

The clutch device 6 of this example includes a first rotating member 8, a second rotating member 9, a third rotating member 10, an engaging element 11, and a biasing member 12. Note that, in the following description with respect to the clutch device 6, unless specified otherwise, an axial direction, a radial direction, and a circumferential direction refer to the axial direction, the radial direction, and the circumferential direction of the clutch device 6. In this example, as illustrated in FIG. 2 and the like, the axial direction, the radial direction, and the circumferential direction of the clutch device 6 coincide with the axial direction, the radial direction, and the circumferential direction of the first rotating member 8, and coincide with the axial direction, the radial direction, and the circumferential direction of the second rotating member 9 and the third rotating member 10. In regard to the clutch device 6 of this example, one side in the axial direction is the right side in FIGS. 2, 4, 5, 10, 13, 14, and 16 to 19, and the other side in the axial direction is the left side in FIGS. 2, 4, 5, 10, 13, 14, and 16 to 19.

Figure 4:
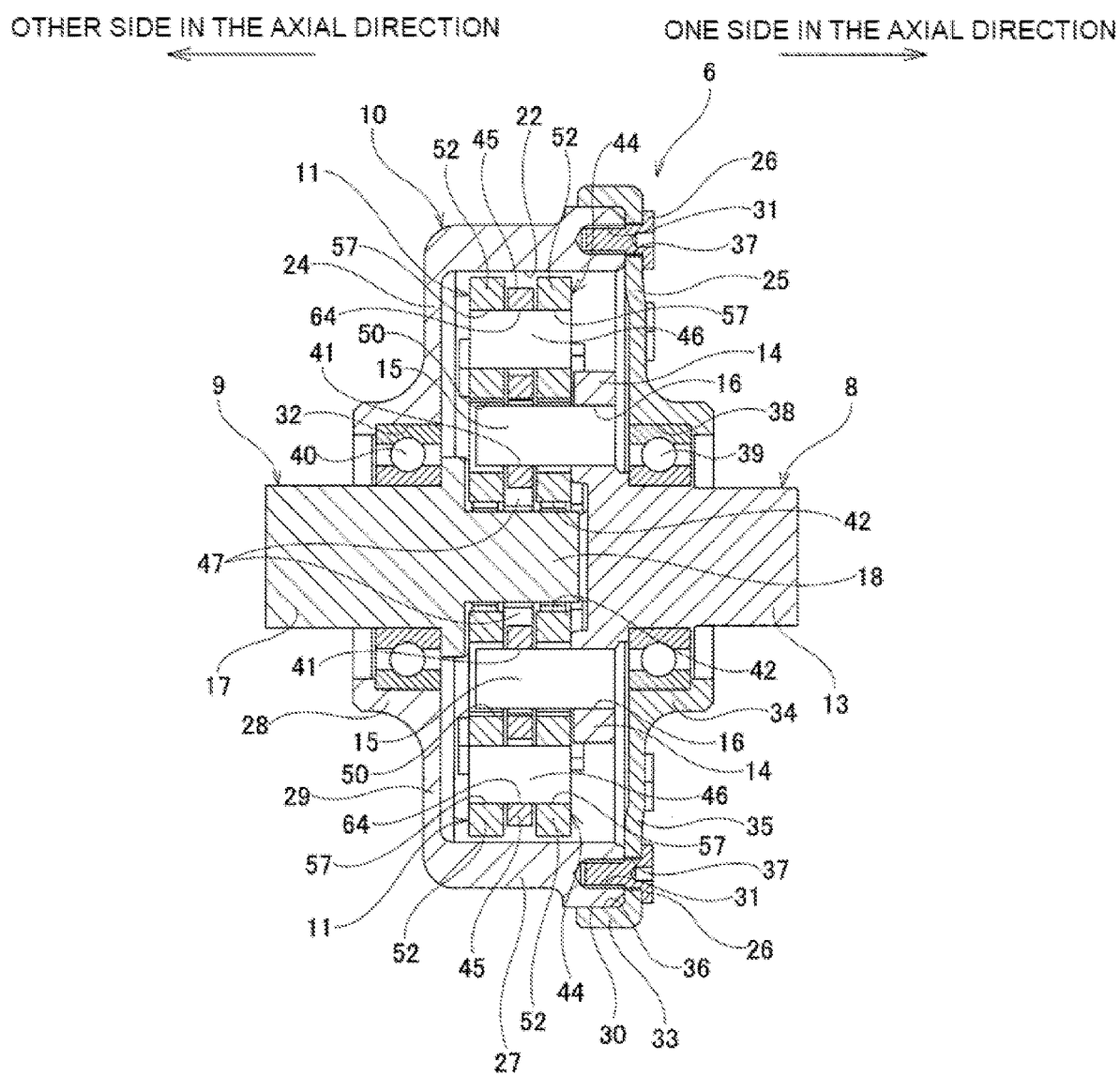
FIG. 4 is a cross-sectional view taken along the section line A-A in FIG. 3.
Figure 5:
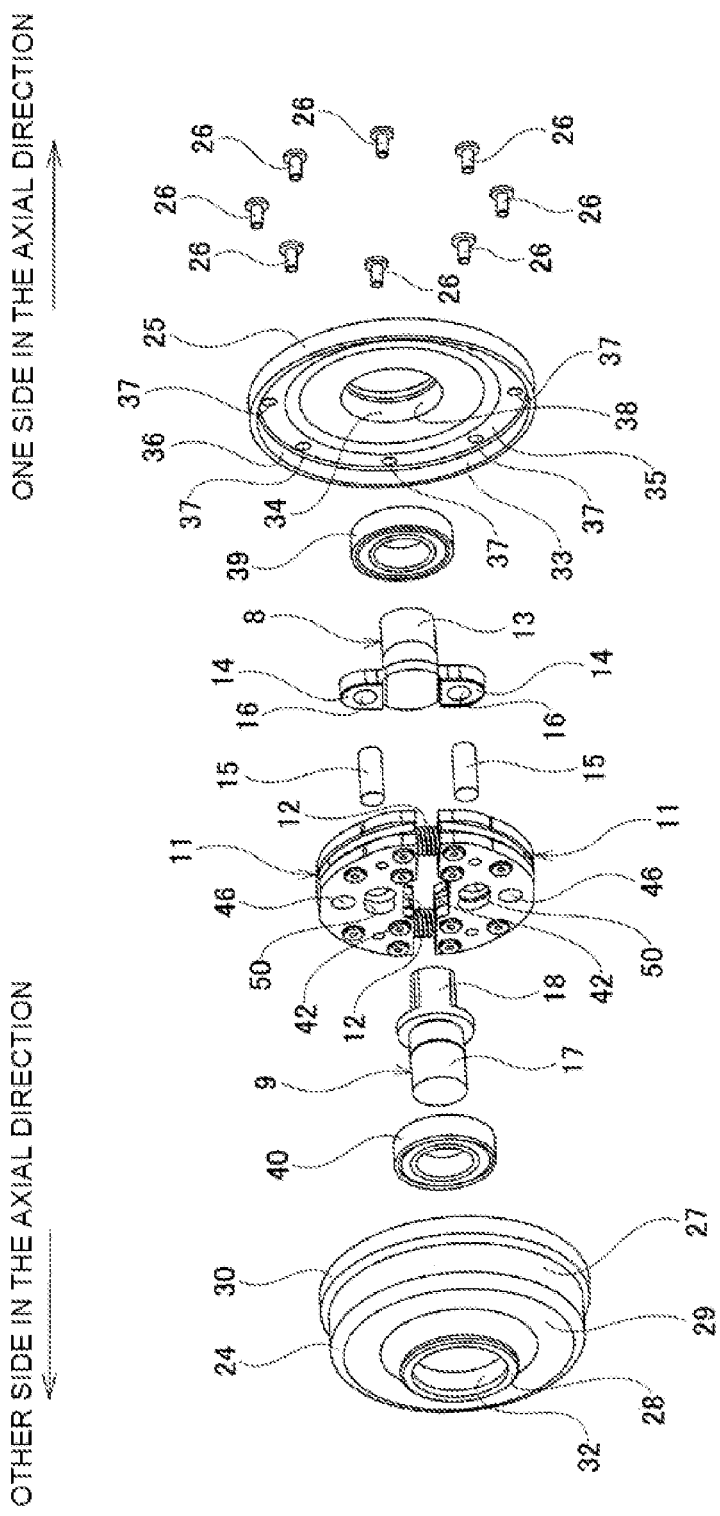
FIG. 5 is an exploded perspective view of the clutch device of the first example.

As illustrated in FIGS. 4 and 5, the first rotating member 8 has a first shaft portion 13 having a columnar shape, a pair of arm portions 14, and a pair of first-rotating-member-side engaging portions 15. The pair of arm portions 14 extend toward opposite sides in the radial direction to each other from the end portion on the other side in the axial direction of the first shaft portion 13. Each of the pair of arm portions 14 has a support hole 16 as a through hole in the axial direction in the intermediate portion in the radial direction thereof. Each of the pair of first-rotating-member-side engaging portions 15 is configured by a columnar pin. The end portion on the one side in the axial direction of each first-rotating-member-side engaging portion 15 is internally press-fitted and fixed to the support hole 16 of each arm portion 14. In this state, the pair of first-rotating-member-side engaging portions 15 extend toward the other side in the axial direction from the pair of arm portions 14. Note that the first rotating member may be formed integrally (by one part) as a whole.

As illustrated in FIGS. 4 and 5, the second rotating member 9 is arranged coaxially with the first rotating member 8, and has a second shaft portion 17 and a second-rotating-member-side engaging portion 18. The second shaft portion 17 is integrally formed with the rotating shaft 4 at the end portion on the one side in the axial direction of the rotating shaft 4, or is coupled and fixed to the end portion on the one side in the axial direction of the rotating shaft 4. The second-rotating-member-side engaging portion 18 is configured in a substantially oval columnar shape, and extends toward the one side in the axial direction from the center portion of the end surface on the one side in the axial direction of the second shaft portion 17. As illustrated in FIGS. 6, 7, 21(A), and 21(B), the outer-circumferential surface of the second-rotating-member-side engaging portion 18 has a pair of side surfaces 19 on both sides in the minor axis direction (up-down direction in FIGS. 6, 7, 21(A), and 21(B)), and has a pair of guiding surfaces 20 as side surfaces on both sides in the major axis direction (left-right direction in FIGS. 6, 7, 21(A), and 21(B)).

Each of the pair of side surfaces 19 is configured by a flat surface orthogonal to the minor axis direction of the second-rotating-member-side engaging portion 18. Each of the pair of guiding surfaces 20 is configured by a convex curved surface. Specifically, each guiding surface 20 is configured by a partially cylindrical convex surface centered on the center axis of the second-rotating-member-side engaging portion 1 (center axis of the second rotating member 9). Therefore, in regard to the second rotating member 9, for example, the outer-circumferential surface of the round bar material may be used as the pair of guiding surfaces 20, thereby suppressing the working cost. However, each guiding surface may be constituted by a partially cylindrical convex surface centered on an axis that is parallel to and not coaxial with the center axis of the second rotating member 9, or a non-cylindrical convex surface such as a partially elliptical cylinder convex surface or the like. In this example, the second shaft portion 17 and the second-rotating-member-side engaging portion 18 are integrally formed. However, the second rotating member may be constituted by separately forming a second shaft portion and a second-rotating-member-side engaging portion, and coupling and fixing them to each other. The second-rotating-member-side engaging portion 18 is arranged further on the inner side in the radial direction than the pair of first-rotating-member-side engaging portions 15, more specifically, in a portion between the pair of first-rotating-member-side engaging portions 15.

The third rotating member 10 has a gear portion 21 constituting a torque input/output portion on the outer circumferential surface thereof, and has a third-rotating-member-side engaging portion 22 on the inner circumferential surface thereof. Note that the gear portion 21 is illustrated only in FIG. 1, and is omitted in FIG. 2 and the following drawings. In this example, as illustrated in FIGS. 2 to 5, the third rotating member 10 is configured in a hollow disk shape, and is supported by a fixed portion 23 such as a vehicle body through a bearing or the like so as to be able to rotate freely. The third rotating member 10 is arranged coaxially with the first rotating member 8 and the second rotating member 9, and houses the pair of first-rotating-member-side engaging portions 15, the second-rotating-member-side engaging portion 18, the engaging element 11, the biasing member 12 and the like on the inner side thereof. The third rotating member 10 is constituted by coupling a main body 24 arranged on the other side in the axial direction, and a lid body 25 arranged on the one side in the axial direction by a plurality of bolts 26.

The main body 24 includes an outer-diameter-side cylinder portion 27, an inner-diameter-side cylinder portion 28, and a side plate portion 29. The outer-diameter-side cylinder portion 27 is configured in a cylindrical shape. The inner-diameter-side cylinder portion 28 is configured in a cylindrical shape, and is arranged coaxially with the outer-diameter-side cylinder portion 27 on the other side in the axial direction of the outer-diameter-side cylinder portion 27. The side plate portion 29 is configured in a substantially circular flat plate shape, and the end portion on the outer side in the radial direction thereof is connected to the end portion on the other side in the axial direction of the outer-diameter-side cylinder portion 27, and the end portion on the inner side in the radial direction thereof is connected to the end portion on the one side in the axial direction of the inner-diameter-side cylinder portion 28.

The outer-diameter-side cylinder portion 27 has a third-rotating-member-side engaging portion 22 on the inner circumferential surface thereof. The third-rotating-member-side engaging portion 22 is configured by a cylindrical surface centered on the center axis of the main body 24. The outer-diameter-side cylinder portion 27 has a main-body-side faucet fitting surface 30 on the outer-circumferential surface of the end portion on the one side in the axial direction, the main-body-side faucet fitting surface 30 having a larger outer diameter dimension than that of the outer-circumferential surface of a portion adjacent to the other side in the axial direction thereof. The main-body-side faucet fitting surface 30 is configured by a cylindrical surface centered on the center axis of the main body 24. The outer-diameter-side cylinder portion 27 has screw holes 31 at a plurality of positions (eight positions in the illustrated example) at equal intervals in the circumferential direction of the end portion on the one side in the axial direction, the screw holes 31 opening to the side surface on the one side in the axial direction.

The inner-diameter-side cylinder portion 28 has a main-body-side bearing fitting surface 32 on a range from the end portion on the one side in the axial direction to the intermediate portion of the inner circumferential surface thereof. The main-body-side bearing fitting surface 32 is configured by a cylindrical surface centered on the center axis of the main body 24. In other words, the third-rotating-member-side engaging portion 22, the main-body-side faucet fitting surface 30, and the main-body-side bearing fitting surface 32 are arranged coaxially with each other.

The lid body 25 includes an outer-diameter-side cylinder portion 33, an inner-diameter-side cylinder portion 34, and a side plate portion 35. The outer-diameter-side cylinder portion 33 is configured in a cylindrical shape. The inner-diameter-side cylinder portion 34 is configured in a cylindrical shape, and is arranged coaxially with the outer-diameter-side cylinder portion 33 on the one side in the axial direction of the outer-diameter-side cylinder portion 33. The side plate portion 35 is configured in a substantially circular flat plate shape, and the end portion on the outer side in the radial direction thereof is connected to the end portion on the one side in the axial direction of the outer-diameter-side cylinder portion 33, and the end portion on the inner side in the radial direction thereof is connected to the end portion on the other side in the axial direction of the inner-diameter-side cylinder portion 34.

The outer-diameter-side cylinder portion 33 has the gear portion 21 on the outer circumferential surface, the gear portion 21 having recess portions and convex portions alternately arranged on an entire circumference thereof. The gear portion 21 is meshed with the drive-side gear 3 provided in the output shaft 2 of the drive source 1. Note that although the gear portion 21 is provided in the outer-diameter-side cylinder portion 33 of the lid body 25 in this example, a formation position of the gear portion 21 is not particularly limited as long as it is possible to input and/or output torque with respect to the third rotating member. For example, the gear portion 21 may be provided on the outer circumferential surface of the outer-diameter-side cylinder portion 27 of the main body 24. Alternatively, in place of the gear portion 21, a sprocket portion for laying a chain across, or a pulley portion for laying a belt across may be provided on the outer circumferential surface of the outer-diameter-side cylinder portion 33 of the lid body 25 or the outer circumferential surface of the outer-diameter-side cylinder portion 27 of the main body.

The outer-diameter-side cylinder portion 33 has a lid-body-side faucet fitting surface 36 on the inner circumferential surface thereof. The lid-body-side faucet fitting surface 36 is configured by a cylindrical surface centered on the center axis of the lid body 25. The lid-body-side faucet fitting surface 36 has an inner diameter dimension so as to be able to be fitted to the main-body-side faucet fitting surface 30 of the main body 24 without looseness.

The side plate portion 35 has through holes 37 that match the screw holes 31 of the main body 24 at a plurality of positions at equal intervals in the circumferential direction of the end portion on the outer side in the radial direction.

The inner-diameter-side cylinder portion 34 has a lid-body-side bearing fitting surface 38 on a range from the end portion on the other side in the axial direction to the intermediate portion of the inner circumferential surface thereof. The lid-body-side bearing fitting surface 38 is configured by a cylindrical surface centered on the center axis of the lid body 25. In other words, the lid-body-side faucet fitting surface 36 and the lid-body-side bearing fitting surface 38 are arranged coaxially with each other.

The third rotating member 10 is assembled by fitting the lid-body-side faucet fitting surface 36 of the lid body 25 to the main-body-side faucet fitting surface 30 of the main body 24 without looseness, screwing the bolt 26 that is inserted through each through hole 37 of the lid body 25 into each screw hole 31 of the main body 24 and further tightening it, and thus coupling and fixing the main body 24 and the lid body 25 to each other. In this example, the main-body-side faucet fitting surface 30 and the main-body-side bearing fitting surface 32 of the main body 24 are arranged coaxially with each other, and the lid-body-side faucet fitting surface 36 and the lid-body-side bearing fitting surface 38 of the lid body 25 are arranged coaxially with each other. Due to this, in the assembled state of the third rotating member 10 where the main-body-side faucet fitting surface 30 and the lid-body-side faucet fitting surface 36 are fitted to each other without looseness, the lid-body-side bearing fitting surface 38 and the main-body-side bearing fitting surface 32 are arranged coaxially with each other.

In the assembled state of the third rotating member 10, the first shaft portion 13 of the first rotating member 8 is rotatably supported to the lid-body-side bearing fitting surface 38 of the lid body 25 by a lid-body-side bearing 39. In addition, the second shaft portion 17 of the second rotating member 9 is rotatably supported to the main-body-side bearing fitting surface 32 of the main body 24 by a main-body-side bearing 40. Due to this, the first rotating member 8 and the second rotating member 9 are arranged coaxially with each other, and arranged coaxially with the third-rotating-member-side engaging portion 22 of the third rotating member 10. In this state, the pair of first-rotating-member-side engaging portions 15 are arranged on the inner side in the radial direction of the third-rotating-member-side engaging portion 22, and the second-rotating-member-side engaging portion 18 is arranged on the inner side in the radial direction of the third-rotating-member-side engaging portion 22. Note that although single row ball bearings are used as the lid-body-side bearing 39 and the main-body-side bearing 40 in the illustrated example, tapered roller bearings in which the directions of the contact angles are different from each other, and double row rolling bearings may be used.

In this example, the engaging element 11 is constituted by a pair of engaging elements 11 (two engaging elements 11) that is arranged so as to sandwich the second-rotating-member-side engaging portion 18 by the inner side surfaces in the radial direction thereof from the outsides in the radial direction. The pair of engaging elements 11 has a pair of engaging element-side first engaging portions 41 engaging with the pair of first-rotating-member-side engaging portions 15, engaging-element-side second engaging portions 42 engaging with the second-rotating-member-side engaging portion 18, and engaging-element-side third engaging portions 43 engaging with the third-rotating-member-side engaging portion 22, and are arranged on the inner side in the radial direction of the third-rotating-member-side engaging portion 22. Each of the pair of engaging elements 11 includes an engaging element main body 44, and a link member 45 connected to the engaging element main body 44 so as to be able to swing. However, when embodying the present invention, the number of the engaging elements is not limited to two, for example, the engaging element may be configured by one engaging element by omitting one of two engaging elements of the pair of engaging elements. Alternatively, the engaging element may be configured by three or more engaging elements.

In this example, as illustrated in FIGS. 14 to 19, the engaging element main body 44 of each engaging element 11 is configured by combining a plurality of parts. Hereinafter, the entire structure of the engaging element main body 44 will be described, and then the structure of each part of the engaging element main body 44 will be described.

The engaging element main body 44 has a substantially semicircular plate shape, and includes a pair of engaging element-side third engaging portions 43 facing the third-rotating-member-side engaging portion 22, a swinging support shaft 46 constituting a swinging support portion, and an engaging-element-side second engaging portion 42 engaging with the second-rotating-member-side engaging portion 18.

In this example, the outer-circumferential surface of the engaging element main body 44 is constituted by an arc-shaped convex outer side surface in the radial direction that corresponds to an arc of the engaging element main body 44, and a crank-shaped inner side surface in the radial direction that corresponds to a chord of the engaging element main body 44. Note that the radial direction with respect to the engaging element main body 44 is referred to as a direction indicated by an arrow X in FIG. 6, which is orthogonal to the chord of the engaging element main body 44, and corresponds to a direction of movement of the engaging-element-side third engaging portions 43 toward or away from the third-rotating-member-side engaging portion 22. In addition, the width direction with respect to the engaging element main body 44 is referred to as a direction indicated by an arrow Y in FIG. 6, which is parallel to the chord of the engaging element main body 44.

In this example, the pair of engaging elements 11 are arranged on the inner side in the radial direction of the third-rotating-member-side engaging portion 22 in a state where the outer side surfaces in the radial direction of the respective engaging element main bodies 44 are directed to opposite sides, and the inner side surfaces in the radial direction of the respective engaging element main bodies 44 face each other. The inner diameter dimension of the third-rotating-member-side engaging portion 22 and the radial direction dimensions of the engaging element main bodies 44 are regulated so that in a state where the pair of engaging elements 11 are arranged on the inner side in the radial direction of the third-rotating-member-side engaging portion 22, there is a gap that allows the engaging element main bodies 44 to move in the radial direction in at least one of a portion between the third-rotating-member-side engaging portion 22 and the outer side surfaces in the radial direction of the engaging element main bodies 44, and a portion between the inner side surfaces in the radial direction of the engaging element main bodies 44 of the pair of engaging elements 11.

The engaging element main body 44 has the pair of engaging element-side third engaging portions 43 on the outer side surface in the radial direction thereof. The pair of engaging elements-side third engaging portions 43 are portions to be pressed against the third-rotating-member-side engaging portion 22 in a drive mode in which torque transmission between the third rotating member 10 and the second rotating member 9 is possible, and are arranged on both side portions in the circumferential direction of the outer side surface in the radial direction of the engaging element main body 44 so as to be separated from each other in the circumferential direction. Each of the pair of engaging elements-side third engaging portions 43 protrudes farther toward the third-rotating-member-side engaging portion 22 than a portion of the outer side surface in the radial direction of the engaging element main body 44 that is deviated in the circumferential direction from the engaging elements-side third engaging portions 43. Each of the pair of engaging elements-side third engaging portions 43 is configured by a partially cylindrical convex surface having a smaller radius of curvature than that of the third-rotating-member-side engaging portion 22. The portion of the outer side surface in the radial direction of the engaging element main body 44 that is deviated in the circumferential direction from the pair of engaging elements-side third engaging portions 43 (a portion located between the pair of engaging elements-side third engaging portions 43 in the circumferential direction) is a non-contact surface that is not brought into contact with the third-rotating-member-side engaging portion 22.

The engaging element main body 44 has an internal space 47 in a center portion in the thickness direction (in the axial direction) of the center portion in the width direction thereof. The end portions on both sides in the radial direction of the internal space 47 open to the outer side surface in the radial direction and the inner side surface in the radial direction of the engaging element main body 44 respectively. The engaging element main body 44 has the swinging support shaft 46 arranged in the axial direction, and the intermediate portion in the axial direction of the swinging support shaft 46 is arranged in the outer-side portion in the radial direction of the center portion in the width direction of the internal space 47. The swinging support shaft 46 is configured by a columnar pin. The end portions on both sides in the axial direction of the swinging support shaft 46 are supported by portions of the engaging element main body 44 that sandwich the internal space 47 from both sides in the axial direction.

The engaging element main body 44 has the engaging-element-side second engaging portion 42 on the center portion in the width direction of the inner side surface in the radial direction thereof. The engaging-element-side second engaging portion 42 is configured by a substantially rectangular recess portion recessed outward in the radial direction from the center portion in the width direction of the inner side surface in the radial direction of the engaging element main body 44.

Figure 6:
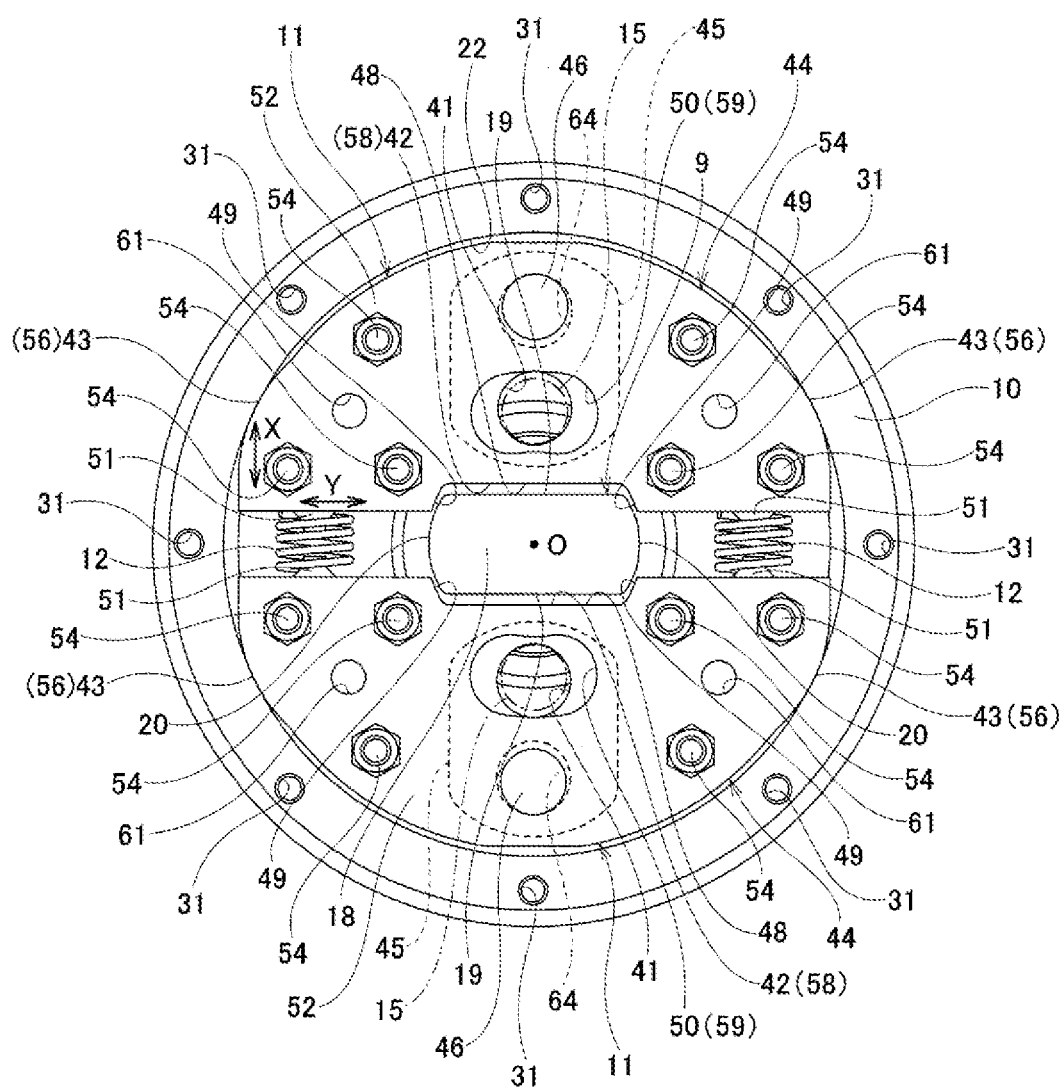
FIG. 6 is an end view of the clutch device of the first example as viewed from the right side of FIG. 4, with a first rotating member, a lid body, and a lid-body-side bearing omitted, in a neutral state where torque is not inputted to a third rotating member.
Figure 21A:
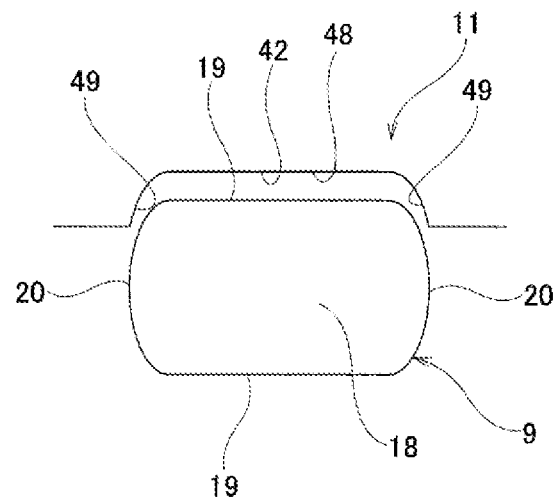
FIG. 21(A) is a view relating to the clutch device of the first example, and illustrating a state before a secondrotating-member-side engaging portion and an engaging-element-side second engaging portion engage with each other.
Figure 21B:
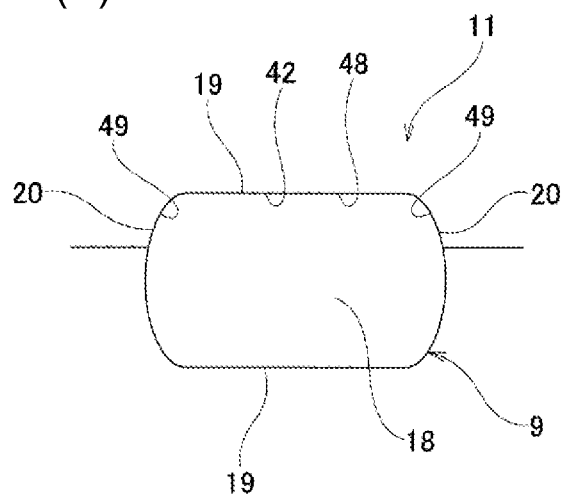
FIG. 21(B) is a view illustrating a state after the second-rotating-member-side engaging portion and the engaging-element-side second engaging portion engage with each other.

As illustrated in FIGS. 6, 21(A), and FIG. 21(B), the engaging-element-side second engaging portion 42 has a size that allows the front half portion in the minor axis direction of the second-rotating-member-side engaging portion 18 to be arranged on the inner side thereof.

The inner surface of the engaging-element-side second engaging portion 42 is configured by a bottom surface 48 and a pair of guided surfaces 49. The bottom surface 48 is configured by a flat surface orthogonal to the radial direction of the engaging element main body 44. The pair of guided surfaces 49 are located on the end portions on both sides of the inner surface of the engaging-element-side second engaging portion 42 with respect to the width direction of the engaging element main body 44, and face each other in the width direction. The pair of guided surfaces 49 are configured by a pair of concave curved surfaces inclined in directions so that the interval therebetween is increased as going toward the inner side in the radial direction of the engaging element main body 44, that is, as going in a direction away from the third-rotating-member-side engaging portion 22 with respect to the radial direction of the engaging element main body 44.

Each of the pair of guided surfaces 49 is configured by a partially cylindrical concave surface that is able to be in contact with the guiding surface 20 of the second-rotating-member-side engaging portion 18, and has a radius of curvature that is the same as or slightly larger than that of the guiding surface 20. In this example, as illustrated in FIG. 21(B), the engaging-element-side second engaging portion 42 has an inner surface shape complementary with the outer-circumferential surface of the front half portion in the minor axis direction of the second-rotating-member-side engaging portion 18. That is, the bottom surface 48 of the engaging-element-side second engaging portion 42 is able to be brought into surface contact with the side surface 19 of the second-rotating-member-side engaging portion 18, and the pair of guided surfaces 49 of the engaging-element-side second engaging portion 42 are able to be brought into surface contact with front half portions in the minor axis direction of the pair of guiding surfaces 20 of the second-rotating-member-side engaging portion 18. Note that each guided surface 49 may be configured by a concave surface that is different from the partially cylindrical shape such as a partially elliptical cylindrical concave surface.

The engaging element main body 44 has an insertion hole 50 in the inner side portion in the radial direction of the center portion in the width direction thereof. The insertion hole 50 penetrates in the axial direction through the inner side portion in the radial direction of the center portion in the width direction of the engaging element main body 44, and is configured by an arc-shaped long hole that extends in the circumferential direction. The insertion hole 50 has a size that allows the first-rotating-member-side engaging portion 15 to be loosely inserted. Specifically, when the first-rotating-member-side engaging portion 15 is inserted into the inner side of the insertion hole 50, there are gaps between the first-rotating-member-side engaging portion 15 and the inner surface of the insertion hole 50 with respect to the circumferential direction and the radial direction of the engaging element main body 44. Therefore, the first-rotating-member-side engaging portion 15 can be relatively displaced with respect to the insertion hole 50 (engaging element main body 44) in the direction of rotation of the first rotating member 8 due to existence of the gap in the circumferential direction. In addition, the insertion hole 50 (engaging element main body 44) can be displaced with respect to the first-rotating-member-side engaging portion 15 in the radial direction of the engaging element main body 44 due to existence of the gap in the radial direction of the engaging element main body 44. In other words, the size of the insertion hole 50 is regulated so that when operating the clutch device 6 (described later), obstruction of the operation of the clutch device 6 due to interference between the inner circumferential edge of the insertion hole 50 and the first-rotating-member-side engaging portion 15 can be prevented.

The engaging element main body 44 has protrusion-shaped convex portions 51 protruding inward in the radial direction on both side portions in the width direction of the inner side surface in the radial direction thereof. Each convex portion 51 protrudes inward in the radial direction from the center portion in the thickness direction (in the axial direction) of each of both side portions in the width direction of the inner side surface in the radial direction of the engaging element main body 44. The convex portions 51 are used for holding the biasing member 12 (described later).

The engaging element main body 44 is configured by a combination of plurality of parts. Specifically, the engaging element main body 44 includes a pair of main body plates 52, a pair of intermediate plates 53, the swinging support shaft 46, and a plurality of bolts 54 and nuts 55 as joining members.

The pair of main body plates 52 are parts that constitute both side portions in the thickness direction of the engaging element main body 44, and are arranged so as to overlap in the axial direction. Each of the pair of main body plates 52 is a press molded product formed by punching a metal plate such as a steel plate or the like by a press working, and has a substantially semicircular plate shape. The main body plate 52 has convex surfaces 56 at two positions separated in the circumferential direction of the outer side surface in the radial direction thereof, which constitute the engaging elements-side third engaging portions 43 in the assembled state of the engaging element main body 44. That is, two pairs of convex surfaces 56 (four convex surfaces 56) that are provided on portions of the outer side surfaces in the radial direction of the pair of main body plates 52 whose phases match each other with respect to the circumferential direction, and that are arranged separate from each other in the axial direction, constitute the engaging-element-side third engaging portions 43. Each main body plate 52 has a support hole 57 having a circular shape in the outer-side portion in the radial direction of the center portion in the width direction thereof. Each main body plate 52 has a plate-side engaging portion 58 on the center portion in the width direction of the inner side surface in the radial direction thereof, which constitutes the engaging-element-side second engaging portion 42 in the assembled state of the engaging element main body 44. That is, the pair of plate-side engaging portions 58 arranged so as to be separated in the axial direction constitute the engaging-element-side second engaging portion 42. Each main body plate 52 has a through hole 59 in the inner side portion in the radial direction of the center portion in the width direction, which constitutes the insertion hole 50 in the assembled state of the engaging element main body 44. Each main body plate 52 has a plurality of (three in the illustrated example) through holes 60 in each of both side portions in the width direction, and has a positioning hole 61 at a position deviated from the plurality of through holes 60 in each of both side portions in the width direction.

The pair of intermediate plates 53 is a member that constitutes the intermediate portion in the thickness direction of the engaging element main body 44. Each of the pair of intermediate plates 53 is a press molded product formed by punching a metal plate such as a steel plate or the like by a press working, and has a substantially fan plate shape. The pair of intermediate plates 53 are sandwiched and held between both side portions in the width direction of the pair of main body plates 52. Each of the pair of intermediate plates 53 has the convex portion 51 in the intermediate portion in the width direction of the inner side surface in the radial direction. The convex portions 51 protrude farther inward in the radial direction than the inner side surfaces in the radial direction of the pair of main body plates 52. Portions of the pair of intermediate plates 53 other than the convex portions 51 are arranged between the pair of main body plates 52. Particularly, the outer side surfaces in the radial direction of the pair of intermediate plates 53 are located further on the inner side in the radial direction than the outer side surfaces in the radial direction of the pair of main body plates 52, and thus are not brought into contact with the third-rotating-member-side engaging portion 22. The pair of intermediate plates 53 have through holes 62 at a plurality of positions matching the through holes 60 of the pair of main body plates 52, and have positioning holes 63 at a position matching the positioning holes 61 of the pair of main body plates 52.

The pair of main body plates 52 and the pair of intermediate plates 53 are coupled and fixed to each other by inserting the plurality of bolts 54 through the through holes 60 of the pair of main body plates 52 and the through holes 62 of the pair of intermediate plates 53, which are aligned with each other, and screwing the tip end portions of the plurality of bolts 54 with the nuts 55 and further tightening them. Note that, in the structure of this example, when performing such a work of coupling and fixing, by inserting positioning rods for the work through the positioning holes 61 of the pair of main body plates 52 and the positioning holes 63 of the pair of intermediate plates 53, which are aligned with each other, the through holes 60 of the pair of main body plates 52 and the through holes 62 of the pair of intermediate plates 53 can be easily aligned with each other. In the structure of this example, in a state where the pair of main body plates 52 and the pair of intermediate plates 53 are coupled and fixed, the internal space 47 is defined between the pair of main body plates 52 with respect to the thickness direction of the engaging element main body 44, and at the same time between the pair of intermediate plates 53 with respect to the width direction.

The swinging support shaft 46 is configured by a columnar pin. The end portions on both sides in the axial direction of the swinging support shaft 46 are internally press-fitted and fixed into the support holes 57 of the pair of main body plates 52. The intermediate portion in the axial direction of the swinging support shaft 46 is arranged in the internal space 47.

The link member 45 is a press molded product formed by punching a metal plate such as a steel plate or the like by a press working, has a substantially rectangular plate shape or a substantially oval plate shape, and is arranged in the internal space 47 (between the pair of main body plates 52) of the engaging element main body 44.

The thickness dimension of the link member 45 is smaller than the width dimension in the axial direction of the internal space 47, that equals an interval between the side surfaces of the pair of main body plates 52 that face each other and a thickness dimension of the intermediate plate 53. The link member 45 has a swinging supported member 64 in the end portion on the one side in the longitudinal direction thereof, and has an engaging-element-side first engaging portion 41 in the end portion on the other side in the longitudinal direction thereof.

The swinging supported member 64 is configured by a circular hole, and the swinging support shaft 46 is inserted through the swinging supported member 64. Due to this, the end portion on the one side in the longitudinal direction of the link member 45 is connected to (supported by) the swinging support shaft 46 so as to be able to swing. The engaging-element-side first engaging portion 41 is configured by a circular hole, and the first-rotating-member-side engaging portion 15 is inserted through the engaging-element-side first engaging portion 41. Due to this, the end portion on the other side in the longitudinal direction of the link member 45 is connected to the first-rotating-member-side engaging portion 15 so as to be able to swing.

Figure 9:
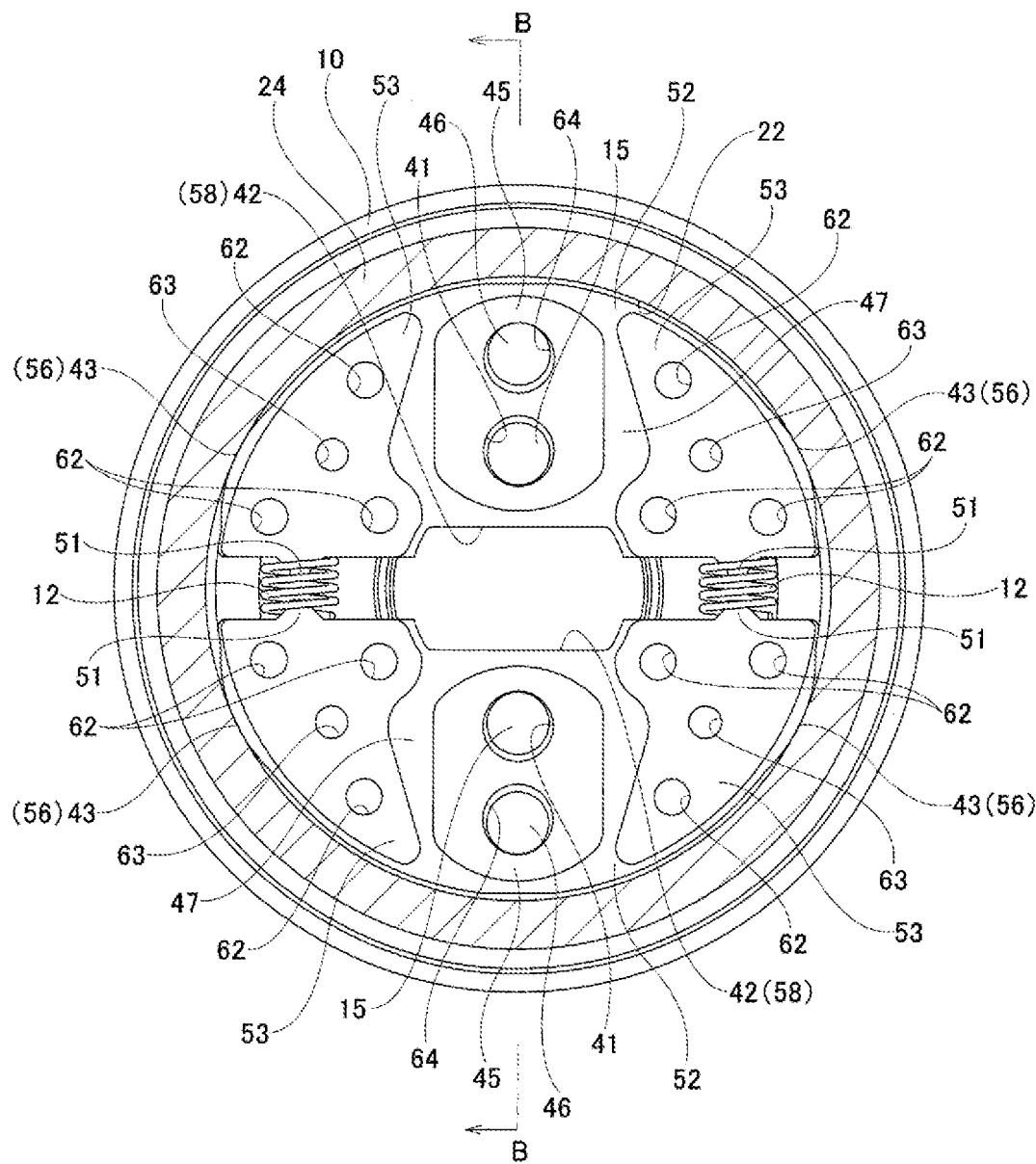
FIG. 9 is an end view of the clutch device of the first example as viewed from the left side of FIG. 4, with the second rotating member, an end portion on the left side of a main body, a main-body-side bearing, a main body plate on the left side, bolts, and nuts omitted.
Figure 10:
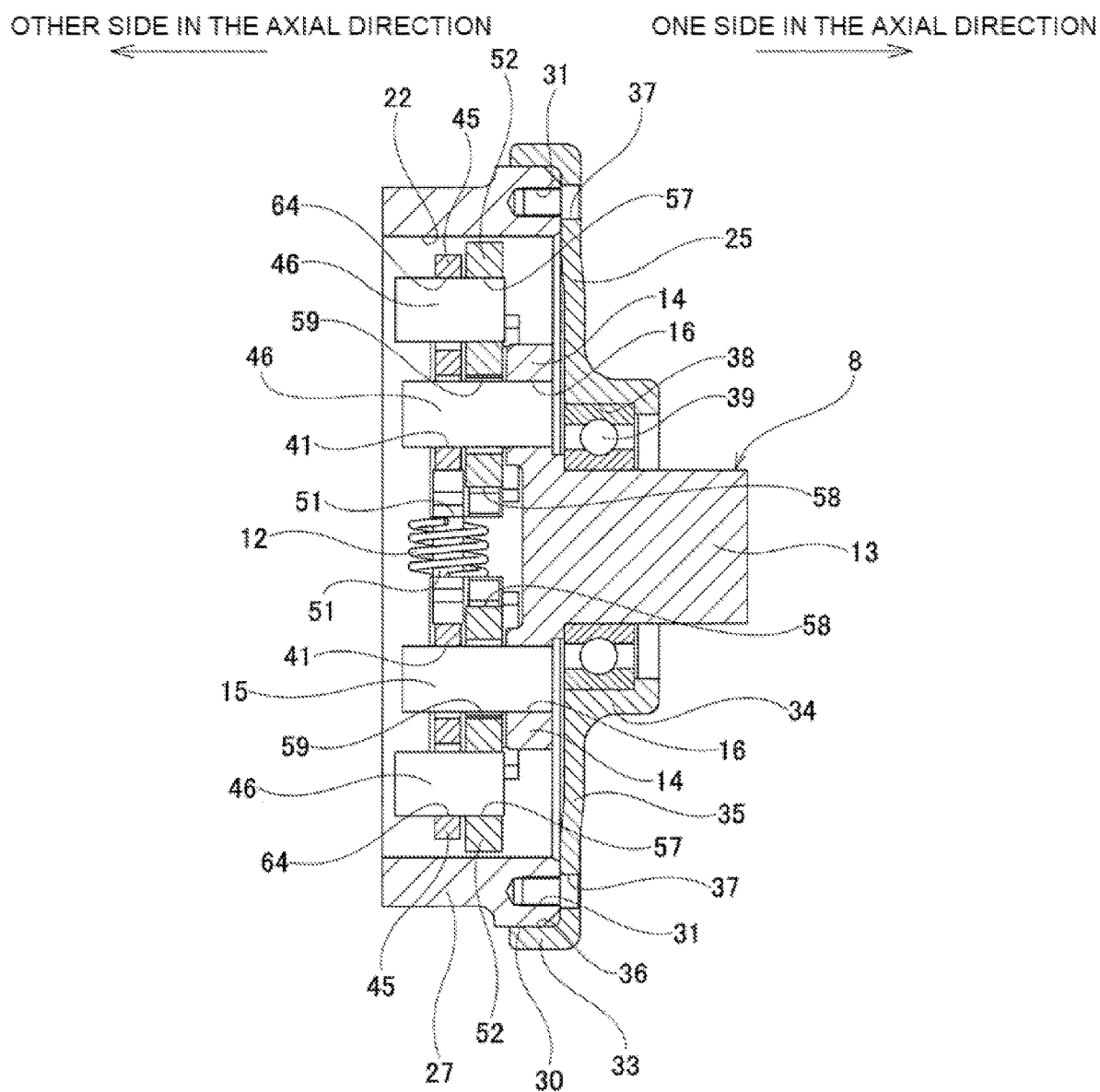
FIG. 10 is a cross-sectional view taken along the section line B-B in FIG. 9.
Figure 11:
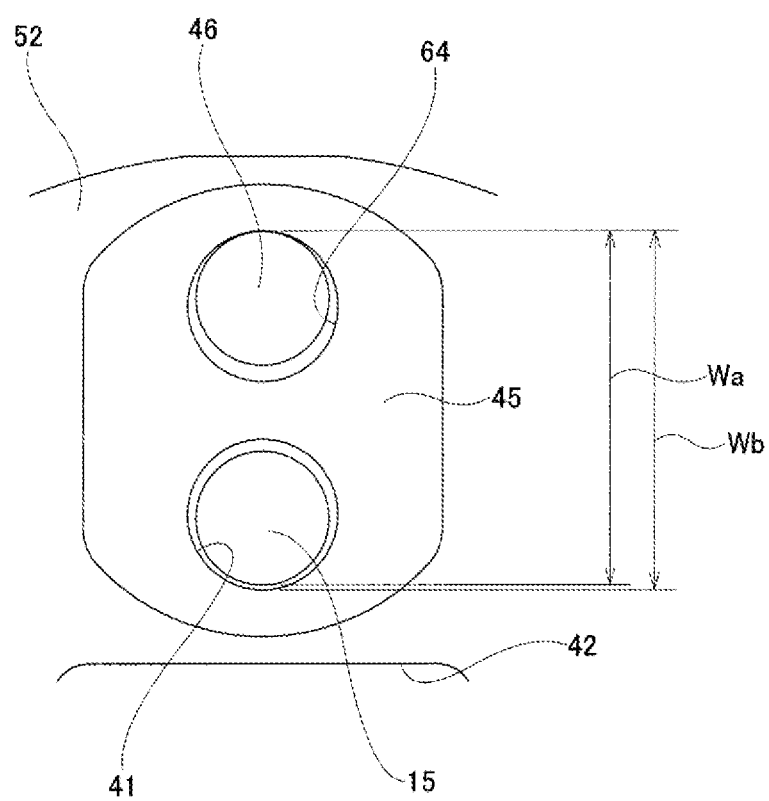
FIG. 11 is an enlarged view of the center portion in the left-right direction of the upper half portion of FIG. 9.
Figure 12:
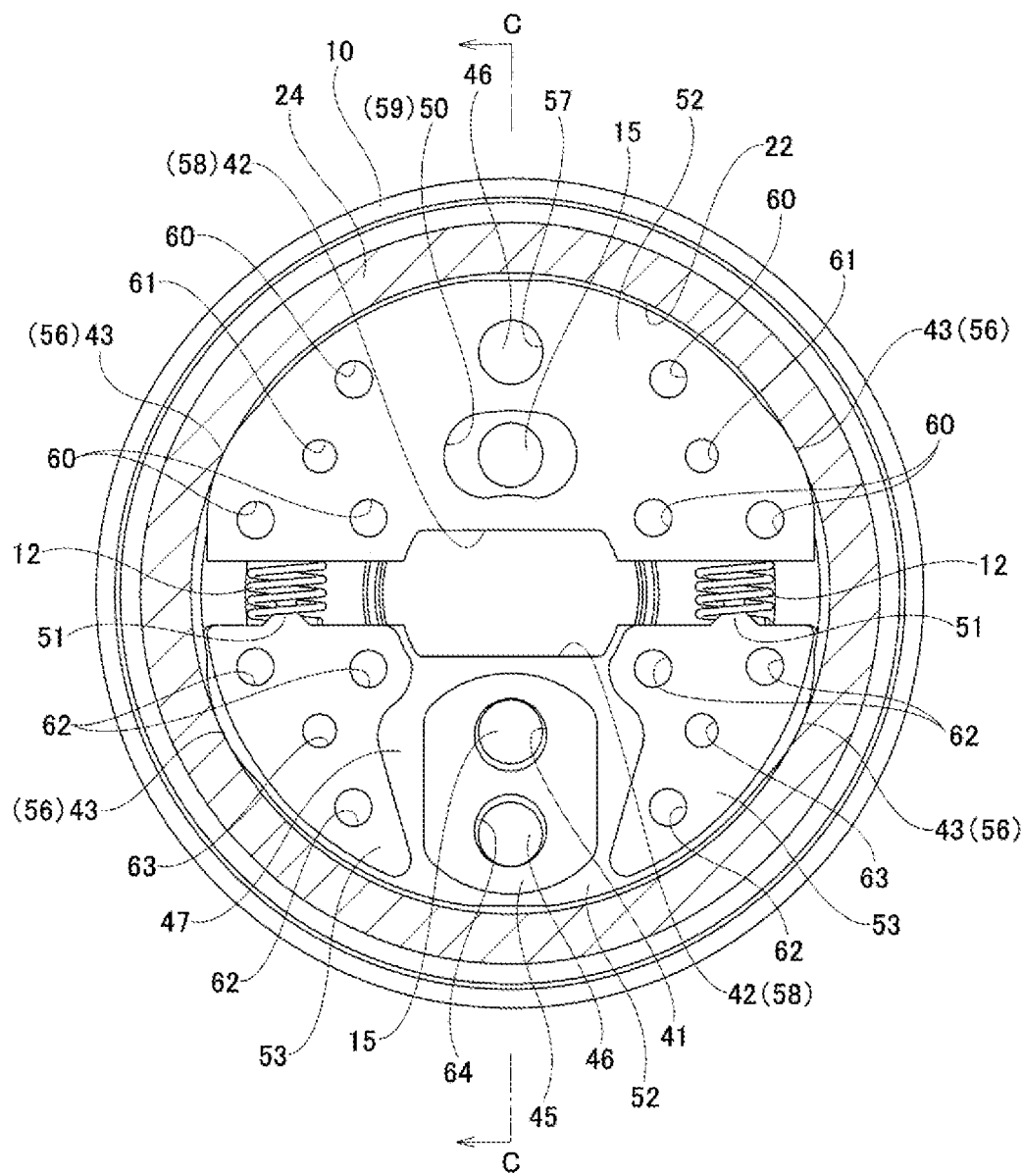
FIG. 12 is a view of the clutch device of the first example, which is similar to FIG. 9, with intermediate plates and a link member omitted from the upper half portion.
Figure 13:
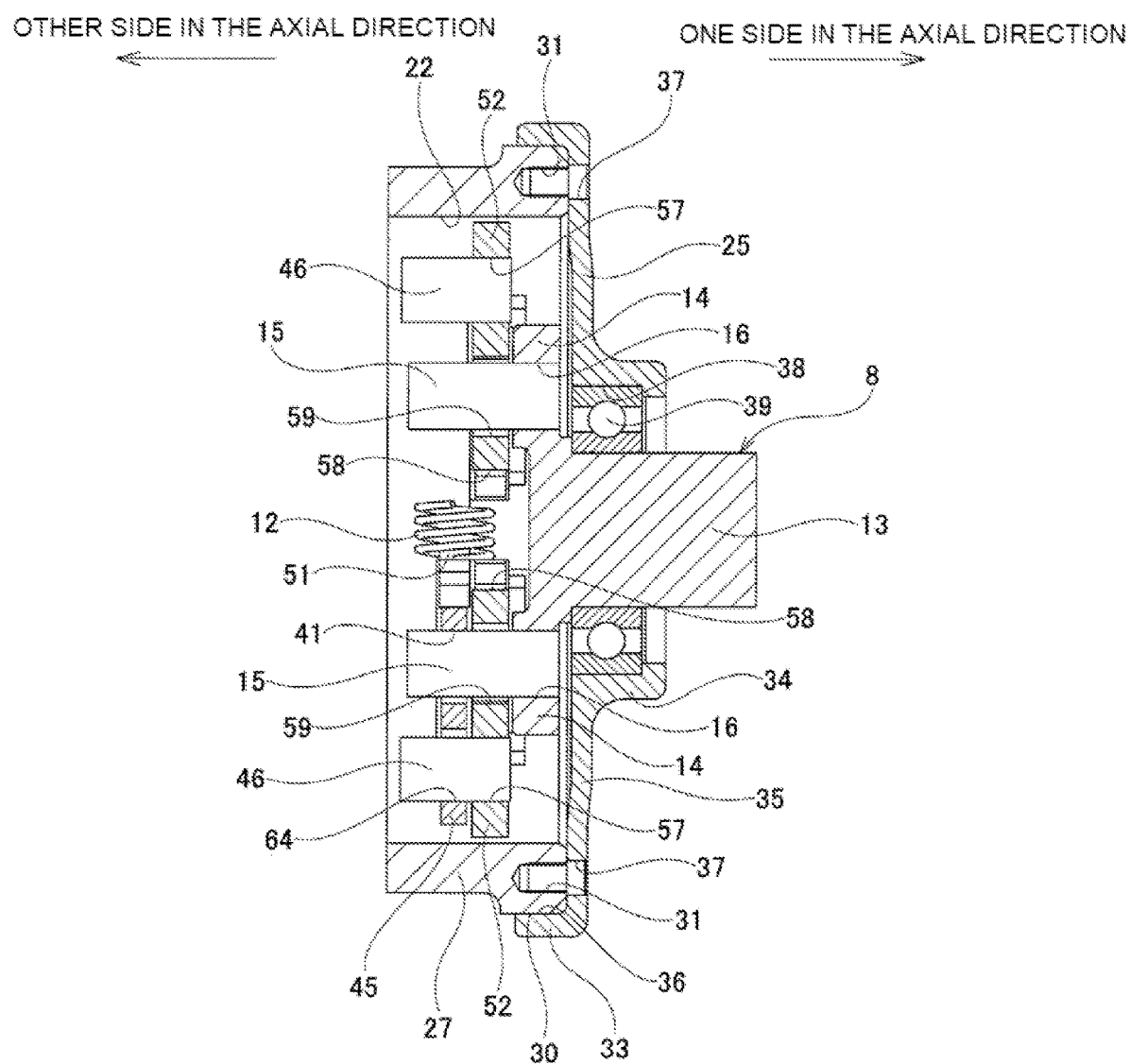
FIG. 13 is a cross-sectional view taken along the section line C-C in FIG. 12.
Figure 14:
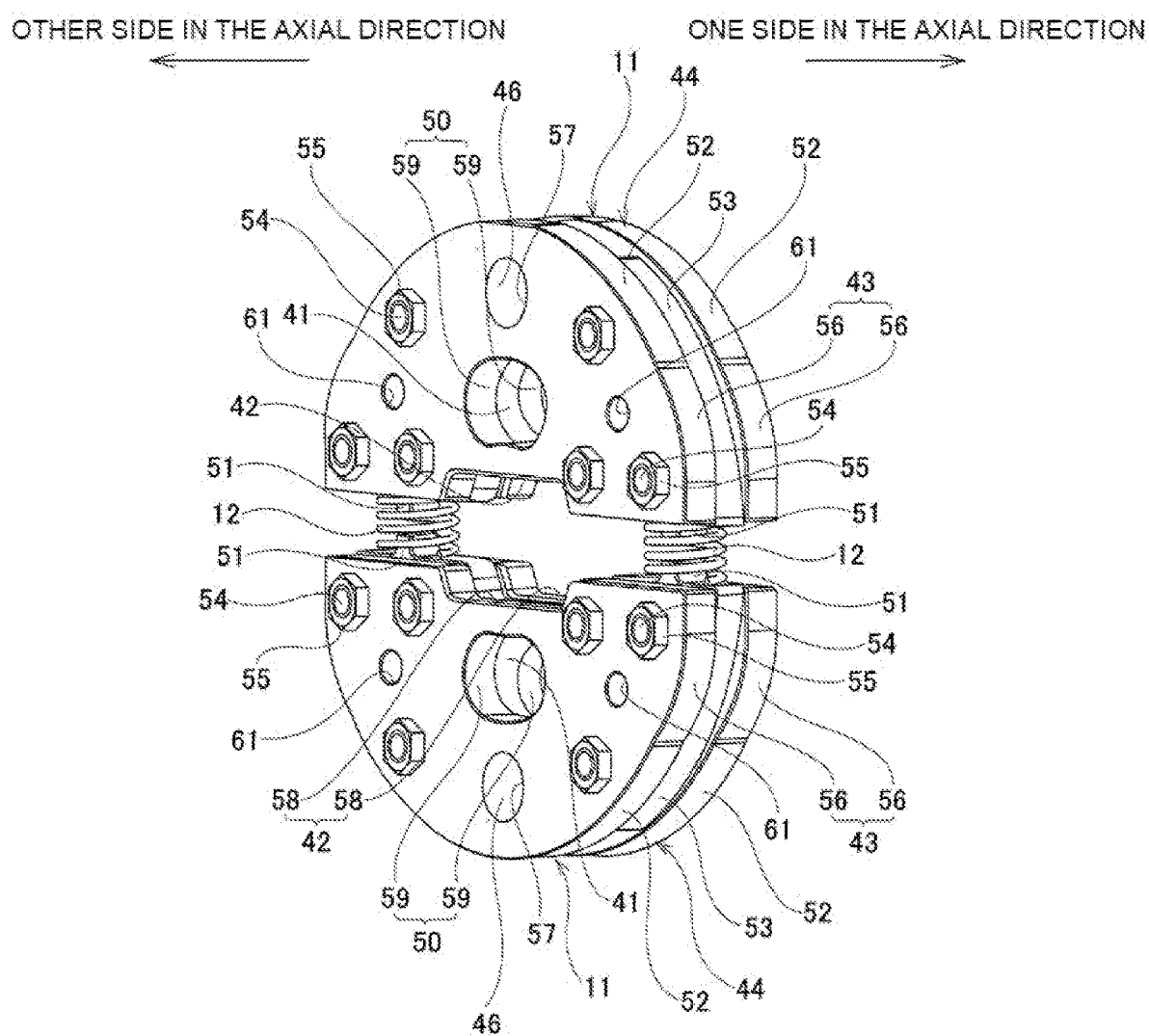
FIG. 14 is a perspective view of a pair of engaging elements and springs of the clutch device of the first example.
Figure 15:
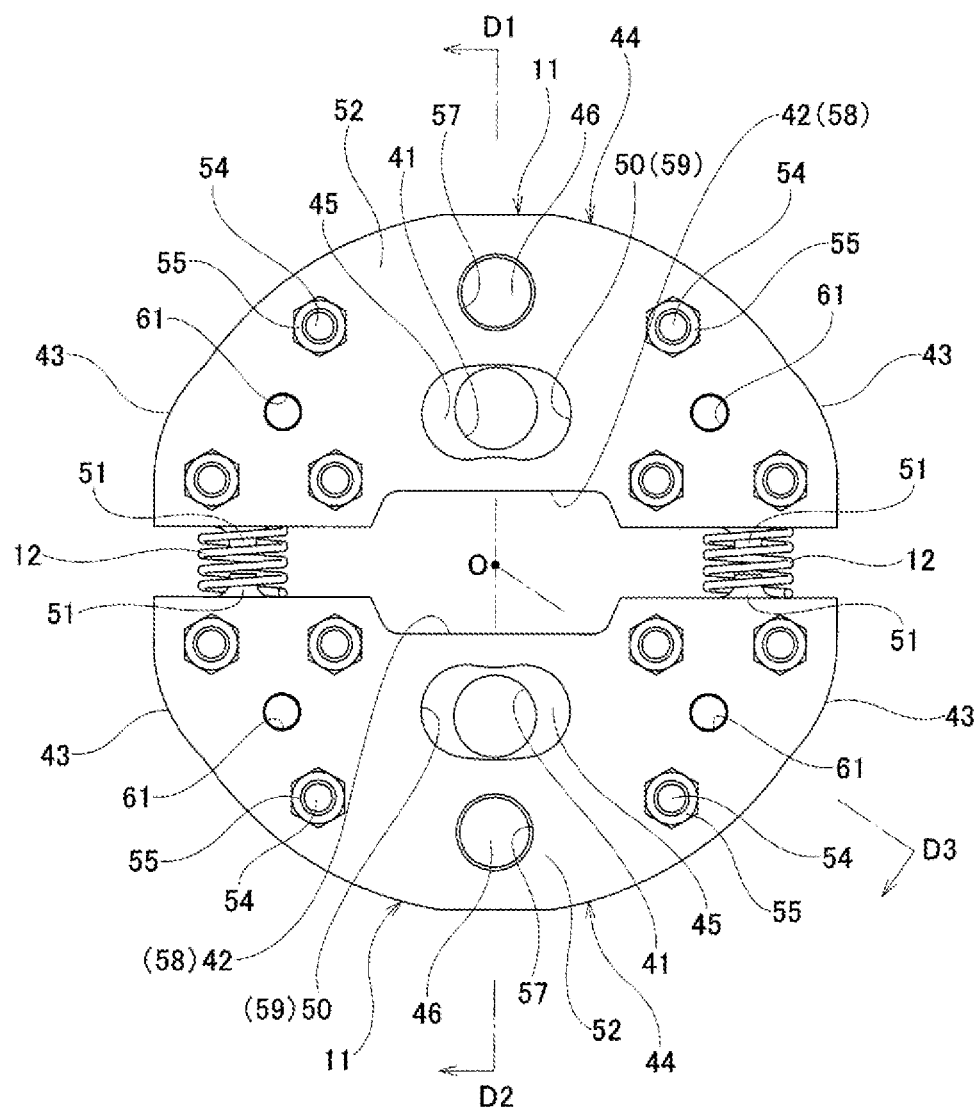
FIG. 15 is an end view of the pair of engaging elements and the springs of the clutch device of the first example as viewed from the side of the second rotating member with respect to the axial direction.

The inner diameter dimension of the swinging supported member 64 is set to be larger than the outer diameter dimension of the swinging support shaft 46, and the inner diameter dimension of the engaging-element-side first engaging portion 41 is set to be larger than the outer diameter dimension of the first-rotating-member-side engaging portion 15. In this example, in a state where the pair of engaging elements-side third engaging portions 43 of the engaging element 11 is in contact with the third-rotating-member-side engaging portion 22, and the first-rotating-member-side engaging portion 15 is located at the center portion in the width direction of the engaging element main body 44 as illustrated in FIGS. 6 and 9, an interval Wa between the end edges on sides of the swinging support shaft 46 and the first-rotating-member-side engaging portion 15 that are farther from each other is set to be equal to or smaller than an interval Wb between the end edges on sides of the swinging supported member 64 and the engaging-element-side first engaging portion 41 that are farther from each other (Wa≤Wb) as illustrated in FIG. 11. Note that the difference Wb−Wa of these intervals Wa and Wb is desirable to be as large as possible from the viewpoint of easily assembling the clutch device 6, and on the other hand, desirable to be as small as possible from the viewpoint of immediately switching from a drive mode to a neutral mode when operating the braking device 7 (described later).

In this example, the biasing member 12 is configured by a pair of biasing members 12 that are arranged between both side portions in the width direction of the inner side surfaces in the radial direction of the pair of engaging elements main bodies 44 of the pair of engaging elements 11. The pair of biasing members 12 is arranged at positions deviated from the second-rotating-member-side engaging portion 18 with respect to width direction of the engaging element main body 44. The pair of biasing members 12 elastically bias the pair of engaging elements 11 respectively in directions toward the outer sides in the radial direction, that is, in directions toward the third-rotating-member-side engaging portion 22 of the pair of engaging elements 11. Due to this, in the neutral state where torque is not inputted to both of the second rotating member 9 and the third rotating member 10, the respective engaging elements-side third engaging portions 43 of the pair of engaging elements 11 are kept in a state of engaging with (being pressed against) the third-rotating-member-side engaging portion 22.

In this example, each of the pair of biasing members 12 is configured by a coil spring. By inserting the convex portions 51 of the pair of engaging elements 11 (two pairs of intermediate plates 53) that face each other into the insides of both side portions in the axial direction of the respective biasing members 12, the biasing members 12 are prevented from falling off from between the inner side surfaces in the radial direction of the pair of engaging elements 11 (two pairs of engaging element main bodies 44). However, the springs can be also prevented from falling off from the engaging element main bodies by forming recess portions (notches) that are recessed outward in the radial direction on both side portions in the width direction of the inner side surface in the radial direction of each engaging element main body (intermediate portions in the width direction of the inner side surfaces in the radial direction of the respective intermediate plates) in place of the convex portions, and inserting the respective end portions of the springs into the recess portions. In addition, the biasing member elastically biases the pair of engaging elements 11 respectively in directions toward the third-rotating-member-side engaging portion is not limited to the coil spring, and may be a plate spring, a disc spring and the like. Other than the configuration that the biasing member is arranged so as to be sandwiched between the pair of engaging elements, the biasing member may also be arranged so as to be sandwiched between the respective engaging elements and the second rotating member.

Figure 16:
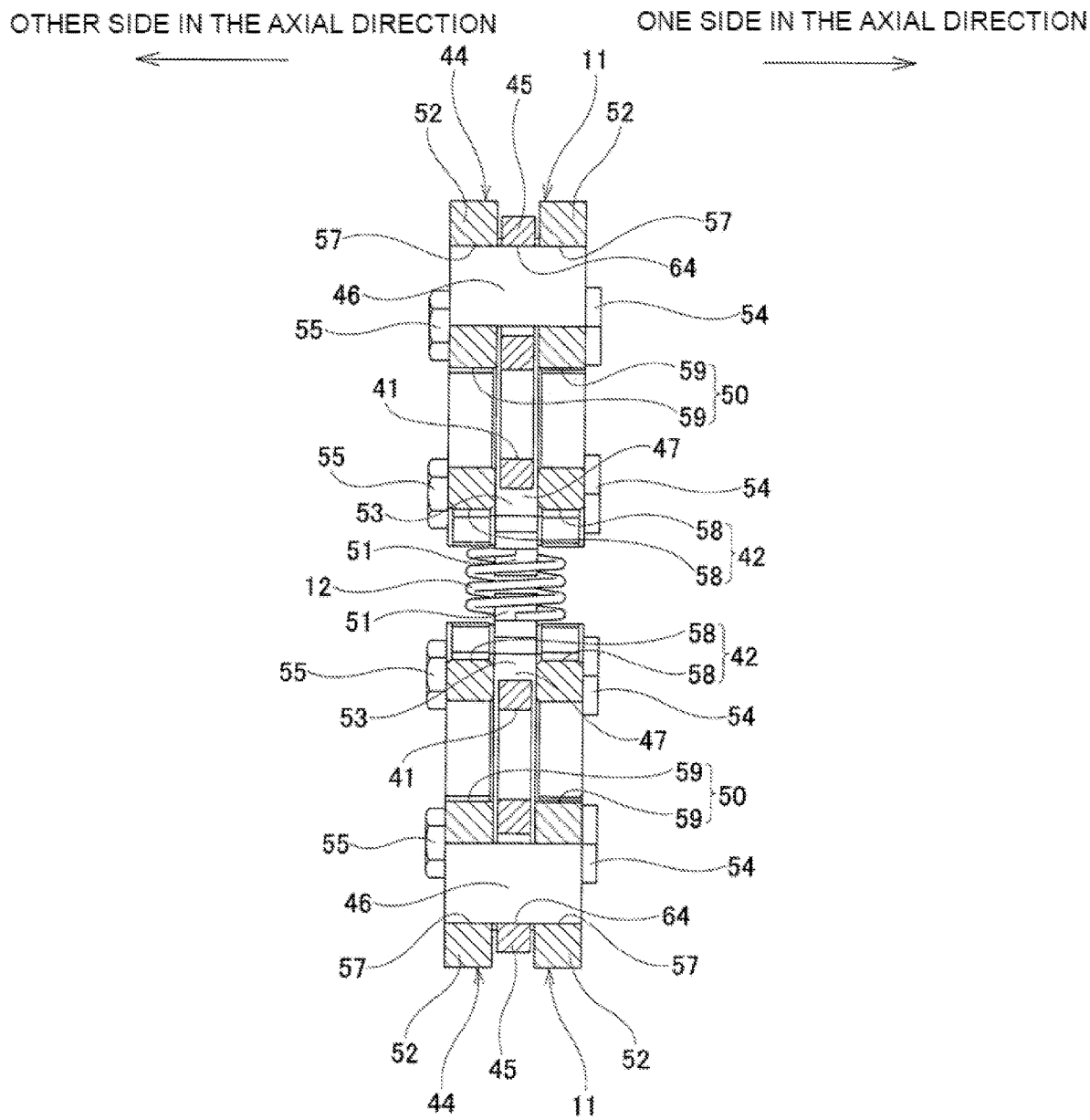
FIG. 16 is a cross-sectional view taken along the section line D1-D2 in FIG. 15.
Figure 17:
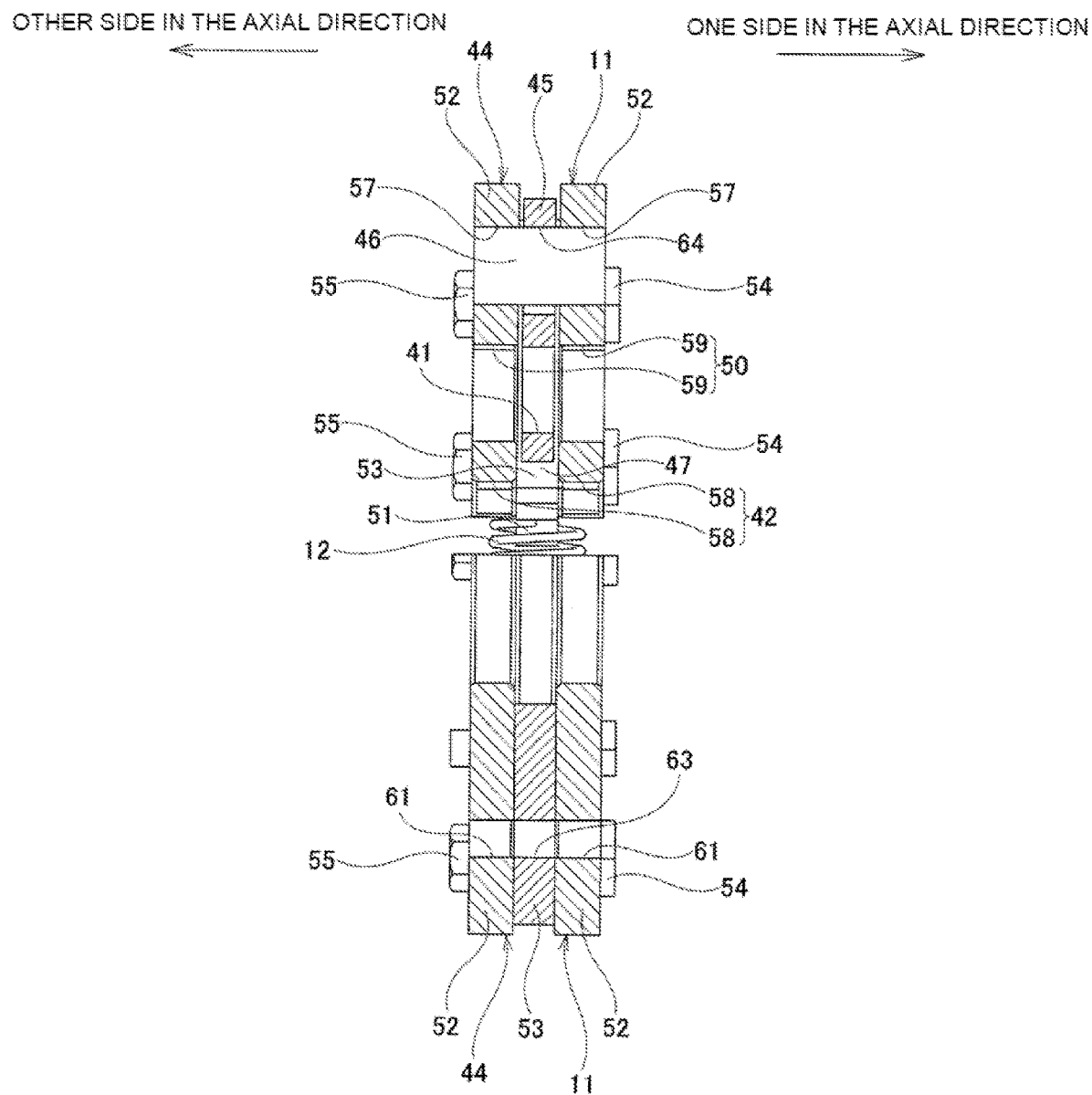
FIG. 17 is a cross-sectional view taken along the section line D1-O-D3 in FIG. 15.
Figure 18:
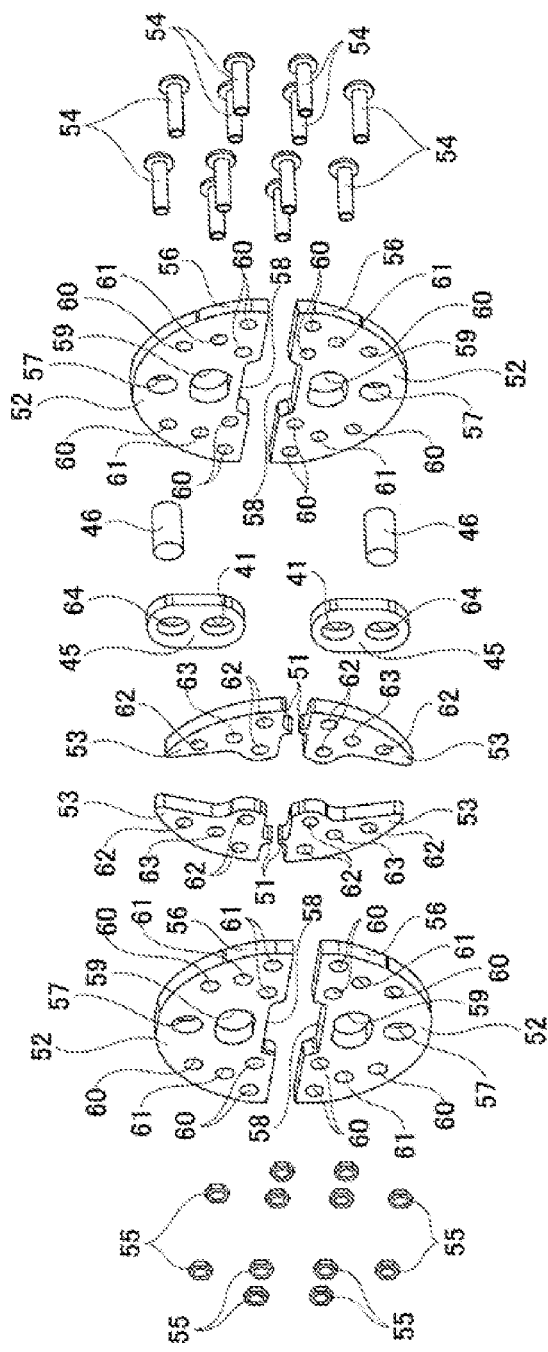
FIG. 18 is an exploded perspective view of the pair of engaging elements of the clutch device of the first example.
Figure 19:
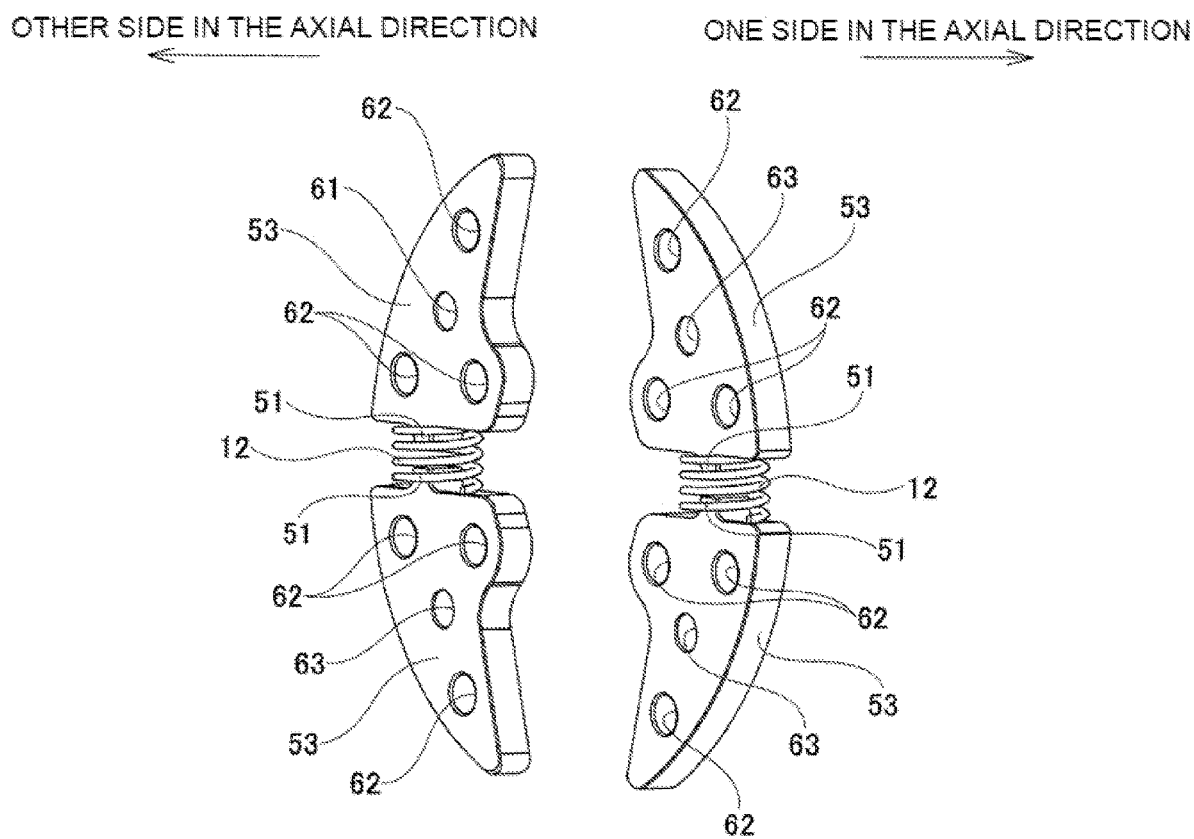
FIG. 19 is a perspective view of the intermediate plates and the springs of the pair of engaging elements of the first example.

In this example, the outer-diameter dimension of the biasing member 12 is smaller than the thickness dimension in the axial direction of the engaging element main body 44. Due to this, as illustrated in FIGS. 16 and 17, the biasing member 12 does not protrude toward both sides in the axial direction (outer sides) from side surfaces on both sides in the axial direction of the engaging element main body 44.

In the assembled state of the clutch device 6 of this example, the pair of first-rotating-member-side engaging portions 15 of the first rotating member 8 arranged on the one side in the axial direction is inserted in the axial direction through insertion holes 50 of the pair of engaging elements 11 (through holes 59 of the pair of main body plates 52) and the engaging-element-side first engaging portions 41, and the second-rotating-member-side engaging portion 18 of the second rotating member 9 arranged on the other side in the axial direction is inserted in the axial direction between the engaging-element-side second engaging portions 42 of the pair of engaging elements 11. That is, the pair of engaging elements 11 is arranged so that the engaging-element-side second engaging portions 42 of the pair of engaging elements 11 sandwich the second-rotating-member-side engaging portion 18 from the outsides in the radial direction.

The braking device 7 is provided between the fixed portion 23 such as a vehicle body and the first rotating member 8, and is configured so as to be able to switch between a state where rotation of the first rotating member 8 with respect to the fixed portion 23 is allowed and a state where rotation of the first rotating member 8 with respect to the fixed portion 23 is prevented. In this example, the braking device 7 is configured by a disk brake device, and includes a brake caliper 65 supported by and fixed to the fixed portion 23, and a brake rotor 66 to rotate together with the first shaft portion 13 of the first rotating member 8, as illustrated in FIG. 1.

When preventing rotation of the first rotating member 8 with respect to the fixed portion 23, a pair of brake pads supported by the brake caliper 65 so as to be able to displace in the axial direction are pressed against the brake rotor 66 by electrically energizing an actuator (not shown) or introducing a hydraulic pressure. The brake rotor 66 is sandwiched and held by the pair of brake pads from both sides in the axial direction to brake the first rotating member 8. On the other hand, when allowing rotation of the first rotating member 8 with respect to the fixed portion 23, the electrical energization of an actuator or the introduction of a hydraulic pressure is stopped. As a result, due to an effect of return spring, the pair of brake pads is moved away from the brake rotor 66, thereby releasing a braking force.

By performing switching so that it is possible or not possible for the first rotating member 8 to rotate with respect to the fixed portion 23 by the braking device 7, the rotation transmission state switching device 5 of this example can switch between a drive mode in which torque transmission between the output shaft 2 of the drive source 1 and the rotating shaft 4 is allowed (possible), and a neutral mode in which the torque transmission is not possible.

<Drive Mode>

In the drive mode, by releasing braking of the first rotating member 8 with respect to the braking device 7, rotation of the first rotating member 8 with respect to the fixed portion 23 is allowed. In this state, when the output shaft 2 is rotated by the drive source 1, torque is inputted to the third rotating member 10 through a meshing part between the drive-side gear 3 and the gear portion 21, and then the third rotating member 10 and the pair of engaging elements 11 integrally rotate (rotate in the same direction and same speed) around a center axis O of the clutch device 6 (see FIG. 3). That is, in the neutral state where torque is not inputted to both of the second rotating member 9 and the third rotating member 10, the third rotating member 10 and the pair of engaging elements 11 are kept in a state where the engaging-element-side third engaging portions 43 are pressed against the third-rotating-member-side engaging portion 22 due to an effect of the pair of biasing members 12, and thus the third-rotating-member-side engaging portion 22 and the engaging-element-side third engaging portions 43 frictionally engage with each other. Accordingly, when the third rotating member 10 rotates around the center axis O as indicated by an arrow a in FIG. 7 according to rotation of the output shaft 2 of the drive source 1, the pair of engaging elements 11 also rotates around the center axis O.

Figure 7:
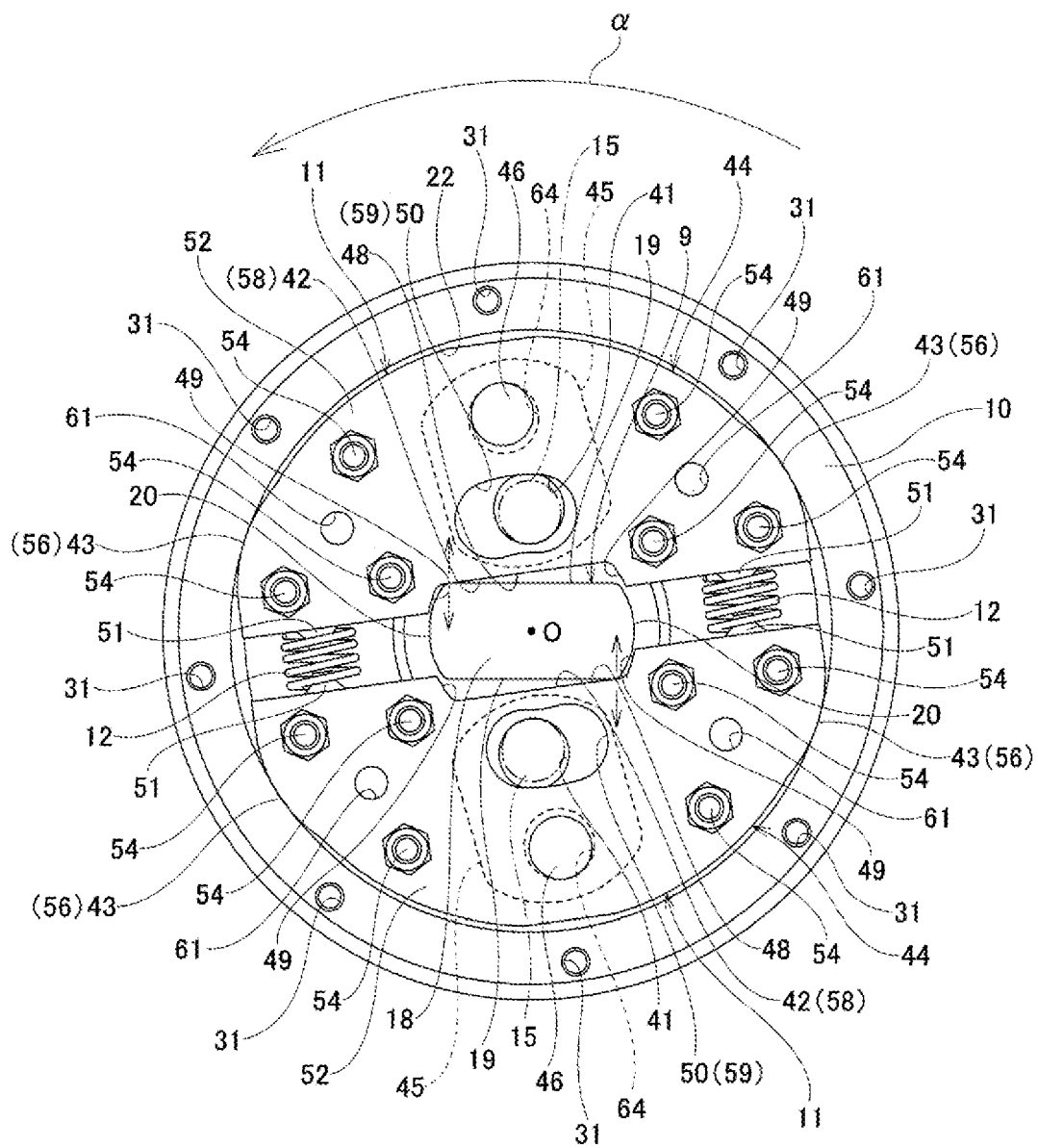
FIG. 7 is a view of the clutch device of the first example, which is similar to FIG. 6, in a state where torque is inputted to the third rotating member.

As illustrated in FIG. 7, when the third rotating member 10 and the pair of engaging elements 11 rotate around the center axis O, the bottom surfaces 48 of the engaging-element-side second engaging portions 42 press corner portions (connecting portions between the side surfaces 19 and the guiding surfaces 20) of the second-rotating-member-side engaging portion 18 in the circumferential direction. Due to this, the second rotating member 9 provided with the second-rotating-member-side engaging portion 18 receives a force that would make the second rotating member 9 rotate in a direction indicated by the arrow a in FIG. 7. At this time, reaction forces that press the engaging elements 11 outward in the radial direction are applied from the corner portions of the second-rotating-member-side engaging portion 18 to the bottom surfaces 48 of the engaging-element-side second engaging portions 42. As a result, frictional forces that act on the contact portions between the third-rotating-member-side engaging portion 22 and the engaging-element-side third engaging portions 43 increase, thereby preventing sliding in the contact portions from occurring.

When the swinging support shafts 46 rotate around the center axis O according to the rotation of the pair of engaging elements 11, the first-rotating-member-side engaging portions 15 of the first rotating member 8 are pulled in the circumferential direction through the link members 45, thereby applying a force that would rotate the first rotating member 8 to the first rotating member 8. In the drive mode, because braking of the first rotating member 8 by the braking device 7 has been released to allow rotation of the first rotating member 8 with respect to the fixed portion 23, when the first-rotating-member-side engaging portions 15 of the first rotating member 8 are pulled in the circumferential direction, the first rotating member 8 rotates around the center axis O. As a result, the first rotating member 8, the second rotating member 9, the third rotating member 10, and the pair of engaging elements 11 integrally rotate. In other words, the entire clutch device 6 integrally rotates. In this way, in the drive mode, torque inputted to the third rotating member 10 is transmitted to the second rotating member 9 and the rotating shaft 4.

Figure 8:
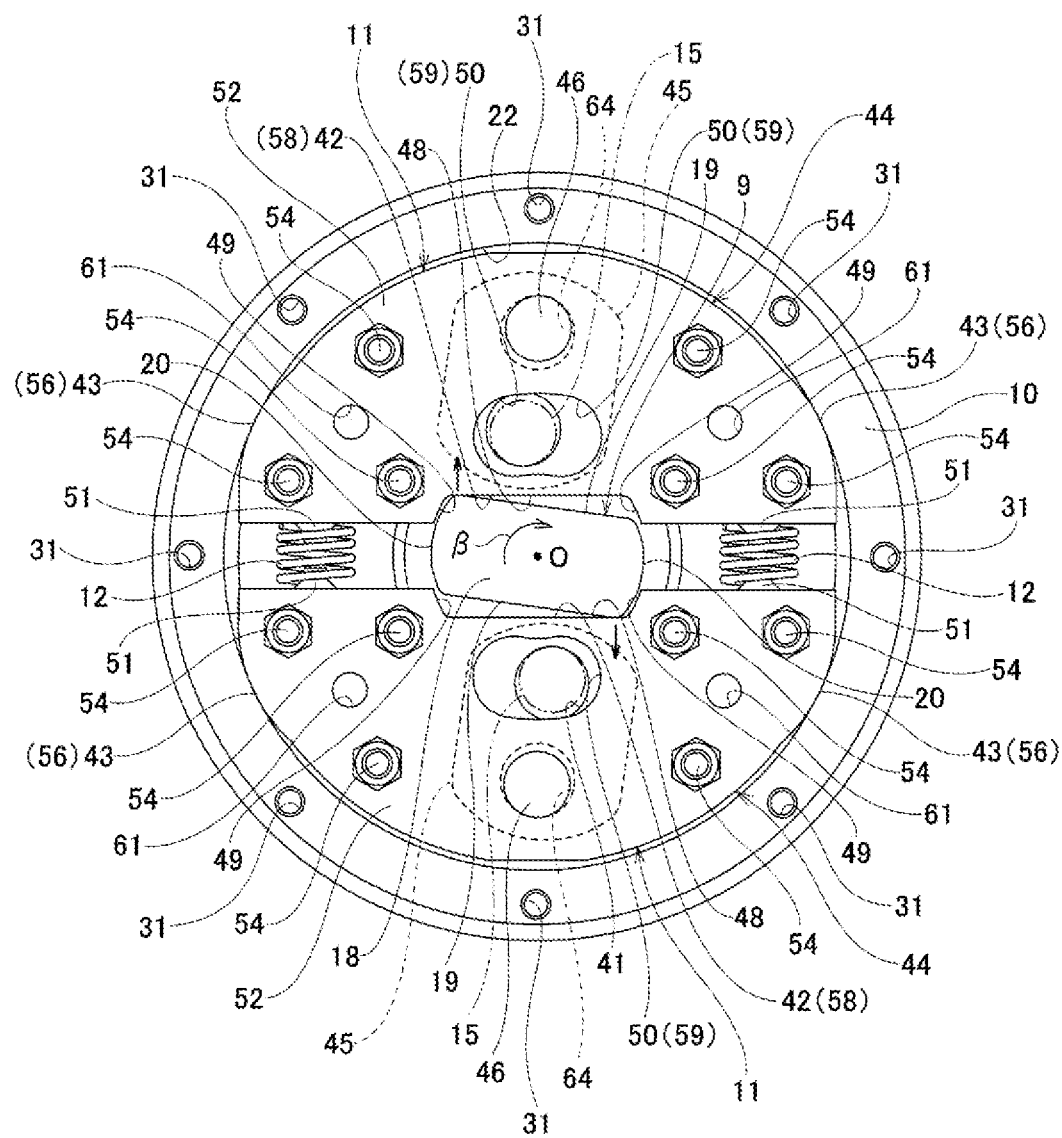
FIG. 8 is a view of the clutch device of the first example, which is similar to FIG. 6, in a state where torque is inputted to a second rotating member.

On the other hand, in the drive mode, when torque (reverse input torque) is applied from a road surface to the second rotating member 9 through the drive wheels, for example, during inertia traveling of a vehicle, as indicated by an arrow 13 in FIG. 8, the second-rotating-member-side engaging portion 18 rotates around the center axis O inside the pair of engaging elements 11. Then, the corner portions which are the connecting portions between the side surfaces 19 and the guiding surfaces 20 of the second-rotating-member-side engaging portion 18 press the bottom surfaces 48 of the engaging-element-side second engaging portions 42 in the circumferential direction. Due to this, the pair of engaging elements 11 is pressed outward in the radial direction, and rotate around the center axis O. As the pair of engaging elements 11 is pressed outward in the radial direction, the engaging-element-side third engaging portions 43 are pressed against the third-rotating-member-side engaging portion 22, and then the third-rotating-member-side engaging portion 22 and the engaging-element-side third engaging portions 43 frictionally engage with each other. Note that, as described above, in a state where the third rotating member 10 rotates in the drive mode, as illustrated in FIG. 7, the third-rotating-member-side engaging portion 22 and the engaging-element-side third engaging portions 43 engage with each other, that is, frictional forces that act on the contact portions increase, thereby preventing sliding in the contact portions from occurring. Therefore, it can also be considered that even when the second rotating member 9 tends to rotate in a direction indicated by the arrow 13 in FIG. 8, the engagement between the third-rotating-member-side engaging portion 22 and the engaging-element-side third engaging portions 43 is maintained. In the drive mode, because rotation of the first rotating member 8 is allowed, when the pair of engaging elements 11 rotates around the center axis O, the third rotating member 10 also rotates around the center axis O due to the frictional engagement between the third-rotating-member-side engaging portion 22 and the engaging-element-side third engaging portions 43. In this way, torque inputted to the second rotating member 9 is transmitted to the third rotating member 10. In this case, the drive source 1 serves as a load on rotation of the drive wheels. That is, according to types of the drive source 1, an engine brake or a regenerative brake acts on a vehicle.

<Neutral Mode>

In the neutral mode, rotation of the first rotating member 8 with respect to the fixed portion 23 is prevented by braking the first rotating member 8 by the braking device 7. In this state, when the output shaft 2 is rotated by the drive source 1, torque is inputted to the third rotating member 10, and then the third rotating member 10 and the pair of engaging elements 11 tend to integrally rotate around the center axis O as indicated by the arrow a in FIG. 7.

When the swinging support shafts 46 tend to rotate around the center axis O with the pair of engaging elements 11 tending to rotate around the center axis O, the first-rotating-member-side engaging portions 15 of the first rotating member 8 are pulled through the link members 45 in the circumferential direction, thereby applying a force that would rotate the first rotating member 8 to the first rotating member 8. However, in the neutral mode, because of braking of the first rotating member 8 by the braking device 7, rotation of the first rotating member 8 with respect to the fixed portion 23 is prevented. Due to this, when the first-rotating-member-side engaging portions 15 are pulled in the circumferential direction by the link members 45, reaction forces are applied from the first-rotating-member-side engaging portions 15 to the link members 45 in directions in which the swinging support shafts 46 are pulled inward in the radial direction.

When the swinging support shafts 46 are pulled inward in the radial direction, forces are applied to the pair of engaging elements 11 in directions away from the third-rotating-member-side engaging portion 22, and thus the pair of engaging elements 11 slightly moves in directions away from the third-rotating-member-side engaging portion 22, that is, inward in the radial direction. As a result, the surface pressure at the contact portions between the engaging-element-side third engaging portions 43 and the third-rotating-member-side engaging portion 22 is reduced or lost, and thus the third rotating member 10 idles (slides) with respect to the engaging elements 11. In this way, in the neutral mode, torque transmission from the third rotating member 10 to the second rotating member 9 is not possible.

In the neutral mode, when torque is applied from the road surface to the second rotating member 9 through the drive wheels, as indicated by an arrow 13 in FIG. 8, the second-rotating-member-side engaging portion 18 tends to rotate around the center axis O on the inner side between the pair of engaging elements 11. Then, the corner portions which are the connecting portions between the side surfaces 19 and the guiding surfaces 20 of the second-rotating-member-side engaging portion 18 press the bottom surfaces 48 of the engaging-element-side second engaging portions 42 in the circumferential direction. Due to this, the pair of engaging elements 11 is pressed outward in the radial direction, and tends to rotate around the center axis O, so that the swinging support shafts 46 tend to pull the first-rotating-member-side engaging portions 15 in the circumferential direction through the link members 45. In the neutral mode, because rotation of the first rotating member 8 is prevented, when the first-rotating-member-side engaging portions 15 are pulled by the link members 45 in the circumferential direction, reaction forces are applied to the link members 45 from the first-rotating-member-side engaging portions 15 in directions in which the swinging support shafts 46 are pulled inward in the radial direction. In this way, forces are applied to the pair of engaging elements 11 in directions away from the third-rotating-member-side engaging portion 22, the pair of engaging elements 11 tends to move in directions away from the third-rotating-member-side engaging portion 22, and thus the surface pressure at the contact portions between the engaging-element-side third engaging portions 43 and the third-rotating-member-side engaging portion 22 is reduced or lost. Due to this, torque inputted to the second rotating member 9 is not able to be transmitted to the third rotating member 10.

In the neutral mode, rotation of the first rotating member 8 is prevented by the braking device 7. Therefore, even when a force that would pull the first-rotating-member-side engaging portions 15 in the circumferential direction is applied from the swinging support shafts 46 through the link members 45, the first-rotating-member-side engaging portions 15 are not able to rotate because of being fixed to the first rotating member 8, thereby preventing the engaging elements 11 from rotating. As a result, the second rotating member 9, which engages with the engaging elements 11, is also prevented from rotating, and thus rotation of the drive wheels can be prevented. In other words, functions as a parking brake can be exhibited.

With the rotation transmission state switching device 5 of this example, by performing switching so that it is possible or not possible to rotate the first rotating member 8 with respect to the fixed portion 23, which does not rotate even in use, by the braking device 7, it is possible to switch between the drive mode in which torque transmission between the second rotating member 9 and the third rotating member 10 is possible, and the neutral mode in which the torque transmission is not possible. In other words, with the rotation transmission state switching device 5 of this example, in order to perform switching so that it is possible or not possible to transmit torque between the second rotating member 9 and the third rotating member 10, it is not necessary to perform switching so that it is possible or not possible for the second rotating member 9 and the third rotating member 10 to relatively rotate. Due to this, as an actuator for switching a fastening state of the braking device 7, an actuator that is compact and is able to generate a large force such as a hydraulic actuator can be used, so that the structure of the rotation transmission state switching device 5 may be easily simplified.

In the clutch device 6 of this example, each of the pair of engaging elements 11 has the engaging-element-side third engaging portions 43 at two positions separated in the circumferential direction of the outer side surface in the radial direction of the engaging element main body 44. Due to this, frictional forces occurring between the third-rotating-member-side engaging portion 22 and the engaging-element-side third engaging portions 43 are able to be increased due to a wedge effect, on the basis that the pair of engaging elements 11 is biased against the third-rotating-member-side engaging portion 22, respectively, by the pair of biasing members 12. However, a structure in which an engaging-element-side third engaging portion is provided at only one position in the circumferential direction of the outer side surface in the radial direction of the engaging element main body may be adopted. Although the engaging-element-side third engaging portions 43 are configured by convex surfaces 56 provided in the pair of main body plates 52 in this example, the engaging-element-side third engaging portions may be provided in the intermediate plates alternatively.

In this example, during switching from the drive mode to the neutral mode of the rotation transmission state switching device 5, when the engaging elements 11 move in directions away from the third-rotating-member-side engaging portion 22 (inward in the radial direction), as illustrated in FIGS. 21(A) to 21(B), the pair of guided surfaces 49 positioned on both sides in the width direction of the engaging-element-side second engaging portion 42 is guided by the pair of guiding surfaces 20 positioned on both sides in the major axis direction of the front half portion in the minor axis direction of the second-rotating-member-side engaging portion 18, and thus movement in the width direction of the engaging element 11 is regulated. Then, as illustrated in FIG. 21(B), the bottom surface 48 of the engaging-element-side second engaging portion 42 is in surface contact with the side surface 19 of the second-rotating-member-side engaging portion 18, and the pair of guided surfaces 49 of the engaging-element-side second engaging portion 42 is in surface contact with the pair of guiding surfaces 20 of the second-rotating-member-side engaging portion 18. Due to this, in the structure of this example, it is possible to effectively prevent the engaging element 11 from being brought into contact with the third-rotating-member-side engaging portion 22 due to slip motion in the width direction of the engaging element 11 after the locked state is released. In the structure of this example, because the movement inward in the radial direction of the engaging element 11 is able to be guided by using the second-rotating-member-side engaging portion 18, the number of parts can be reduced compared to a structure in which another part that is exclusively used for the guiding is assembled.

The pair of guided surfaces 49 of the engaging-element-side second engaging portion 42 is configured by a pair of concave curved surfaces inclined in directions so that the interval therebetween is increased as going inward in the radial direction, and the pair of guiding surfaces 20 of the second-rotating-member-side engaging portion 18 is configured by a pair of convex curved surfaces complementary with the pair of concave curved surfaces. Therefore, as illustrated in FIG. 21(A), in a state where the engaging element 11 is apart from the second-rotating-member-side engaging portion 18 outward in the radial direction, gaps are formed between the pair of guided surfaces 49 and the pair of guiding surfaces 20 so that the size (dimension in the width direction) of the gaps is increased as going outward in the radial direction. Due to this, in the structure of this example, in a state where the engaging element 11 is apart from the second-rotating-member-side engaging portion 18 outward in the radial direction, it is possible to appropriately allow the movement in the width direction and the rotation direction of the engaging element 11, and thus it can be effectively prevented to apply an excessive force to the engaging element 11.

With the rotation transmission state switching device 5 of this example, switching from the drive mode to the neutral mode can be smoothly performed. This point will be described with reference to FIGS. 20(A) and 20(B).

Figure 20A:
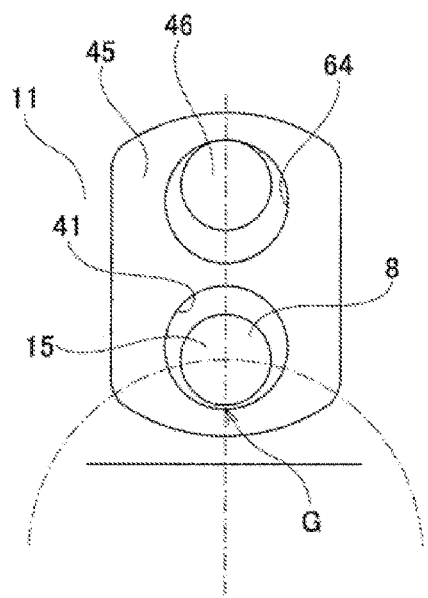
FIG. 20(A)(a) is a view relating to the clutch device of the first example, and illustrating an engagement part between an engaging-element-side first engaging portion and a first-rotating-member-side engaging portion in the neutral state.

FIGS. 20(A)(a) and 20(A)(b) illustrate the mutual positional relation between a part of the first rotating member 8 and a part of the engaging element 11 in regard to the structure of this example. More Specifically, FIG. 20(A)(a) illustrates the positional relation in a state where the first-rotating-member-side engaging portion 15 is located at a center portion in the width direction of the engaging element 11, and the link member 45 is located furthest on the inner side in the radial direction. FIG. 20(A)(b) illustrates the positional relation in a state where the engaging element 11 rotates in a counterclockwise direction in FIG. 20(A)(b) with respect to the first rotating member 8 from the state illustrated in FIG. 20(A)(a), and then a translational load F acts on a contact portion between the first-rotating-member-side engaging portion 15 and the engaging-element-side first engaging portion 41, so that the translational load F starts acting on the swinging support shaft 46 from the first-rotating-member-side engaging portion 15 through the link member 45.

Figure 20B:
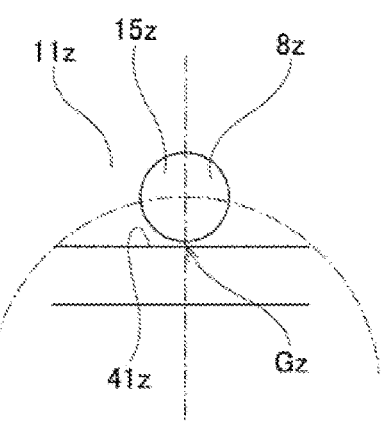
FIG. 20(B)(a) is a view relating to the clutch device of a comparative example, and illustrating an engaging part between an engaging-element-side first engaging portion and a first-rotating-member-side engaging portion in the neutral state.
Figure 20A:
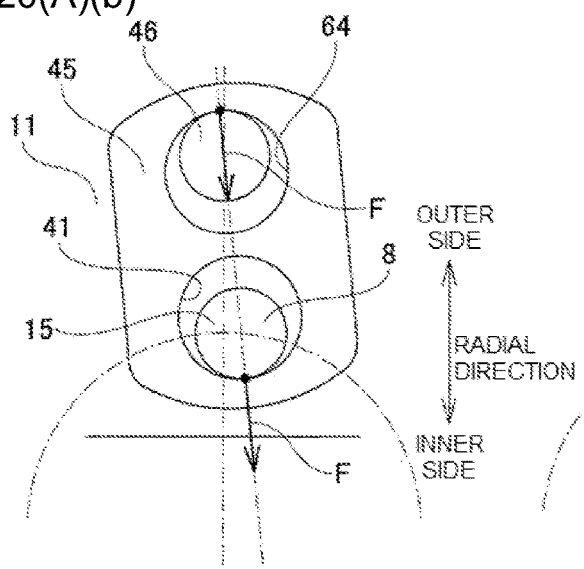
Figure 20B:
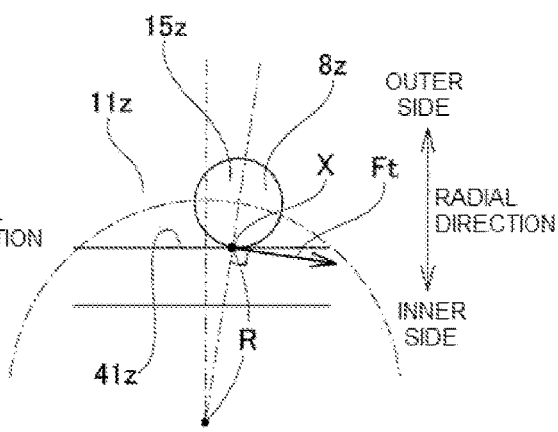

FIGS. 20(B)(a) and 20(B)(b) illustrate the mutual positional relation between a part of the input member 8z and a part of the engaging element 11z in regard to the structure of a comparative example in which the link member is not included, and the integrally configured engaging element 11z has the engaging-element-side first engaging portion 41z. More specifically, FIG. 20(B)(a) illustrates the positional relation in a state where the engaging element 11z is located furthest on the outer side in the radial direction, and the first-rotating-member-side engaging portion 15z is located at the center portion in the width direction of the engaging element 11z. FIG. 20(B)(b) illustrates the positional relation in a state where the engaging element 11z rotates in a counterclockwise direction in FIG. 20(B)(b) with respect to the first rotating member 8z from the state illustrated in FIG. 20(B)(a), the engaging-element-side first engaging portion 41z is brought into contact with the first-rotating-member-side engaging portion 15z, and then a translational load Ft due to the rotational torque T starts acting on a contact portion X between the first-rotating-member-side engaging portion 15z and the engaging-element-side first engaging portion 41z.

In the structure of the comparative example, as illustrated in FIG. 20(B)(b), the direction of the translational load Ft, that is, the direction of the load acting on the engaging element 11z from the first rotating member 8z is largely inclined with respect to the radial direction of the engaging element 11z (direction of movement of the engaging element 11z toward or away from the third-rotating-member-side engaging portion) in which the engaging element 11z should move when switching from the drive mode to the neutral mode.

On the other hand, in the structure of this example, as illustrated in FIG. 20(A)(b), the direction of the translational load F, that is, the direction of the load acting on the engaging element 11 from the first rotating member 8 is substantially parallel to the radial direction of the engaging element 11 (direction of movement of the engaging element 11 toward or away from the third-rotating-member-side engaging portion 22) in which the engaging element 11 should move when switching from the drive mode to the neutral mode. In other words, the angle between the direction of the translational load F and the direction in which the engaging element 11 should move is smaller than the angle between the direction of the translational load Ft and the direction in which the engaging element 11z should move in the structure of the comparative example. In other words, in the structure of this example, a force applied to the first-rotating-member-side engaging portion 15 in the circumferential direction according to rotation of the engaging element 11 around the center axis O, can be effectively converted to a force for moving the engaging element 11 inward in the radial direction. Due to this, according to this example, switching from the drive mode to the neutral mode can be smoothly performed.

The size of the gap Gin the state illustrated in FIG. 20(A)(a) in the structure of this example (the difference Wb-Wa described above) that exists between the inner side surface in the radial direction of the first-rotating-member-side engaging portion 15 and the inner circumferential surface of the engaging-element-side first engaging portion 41 of the link member 45, and the size of the gap Gz in the state illustrated in FIG. 20(B)(a) in the structure of the comparative example that exists between the inner side surface in the radial direction of the first-rotating-member-side engaging portion 15z and the engaging-element-side first engaging portion 41z are both desirable to be as large as possible from the viewpoint of easily assembling the clutch device, and on the other hand desirable to be as small as possible from the viewpoint of immediately achieving the neutral mode by moving the engaging element 11, 11z inward in the radial direction when the first rotating member 8, 8z is braked by the braking device 7. Accordingly, when manufacturing the clutch device, the sizes of the gaps G, Gz should be appropriately adjusted in consideration of these circumstances.

In order to adjust the size of the gap Gz in the structure of the comparative example, the portion of the engaging-element-side first engaging portion 41z to be brought into contact with the inner side surface in the radial direction of the first-rotating-member-side engaging portion 15z may need to be finished with high accuracy by machining working. In this case, the cost is supposed to be high. On the other hand, in the structure of this example, because the size of the gap G can be adjusted only by controlling the distance between the centers of the swinging supported member 64 and the engaging-element-side first engaging portion 41 of the link member 45, and the link member 45 can be formed by a low-cost press working, thereby easily suppressing the cast.

When embodying the present invention, as a joining means for joining the main body 24 and the lid body 25 to constitute the third rotating member 10, and a joining means for joining the pair of main body plates 52 and the pair of intermediate plates 53 to constitute the engaging element main body 44, other joining means such as riveting, welding, adhesion, caulking and the like may be adopted. Furthermore, as such other joining means, a joining means achieved by inserting the intermediate portions in the axial direction of joining shafts into through holes formed at positions of plurality of parts to be joined to each other that match with each other, and then locking retaining rings to both end portions in the axial direction of the joining shafts, thereby sandwiching and holding the plurality of parts by these retaining rings from both sides in the axial direction, may be adopted.

In addition, it is also possible to integrally form one intermediate plate of the pair of intermediate plates on one main body plate of the pair of main body plates, and integrally form the other intermediate plate of the pair of intermediate plates on the other main body plate of the pair of main body plates. Alternatively, it is also possible to integrally form the pair of intermediate plates on one main body plate of the pair of main body plates. By employing these configurations, the engaging element main body can be configured by combining the pair of main body plates, thereby reducing the number of parts.

Although the configuration in which one link member 45 is arranged between the pair of main body plates 52 so as to be able to swing is employed in the clutch device 6 assembled in the rotation transmission state switching device 5 of this example, when embodying the present invention, a configuration in which a pair of link members are arranged on both sides in the thickness direction of one main body plate so as to be able to swing (the engaging element main body is pulled inward in the radial direction by the first-rotating-member-side engaging portion through the pair of link members) may be employed.

Although the drive-side gear 3 provided in the output shaft 2 of the drive source 1 meshes with the gear portion 21 provided on the outer circumferential surface of the third rotating member 10 of the clutch device 6 in this example, and the rotating shaft 4 is connected to the second rotating member 9, when embodying the present invention, it is also possible to connect the output shaft of the drive source to the second rotating member so as to be able to transmit torque, and make the driven-side gear provided in the rotating shaft and the gear portion provided in the third rotating member mesh with each other.

Second Example

The second example of an embodiment of the present invention will be described with reference to FIGS. 22 to 26. In this example, the structure of the clutch device 6a is different from that of the clutch device 6 in the first example.

The clutch device 6a includes the first rotating member 8a, the second rotating member 9a, the third rotating member 10a, the engaging element 11a, and the biasing member 12a.

Figure 23:
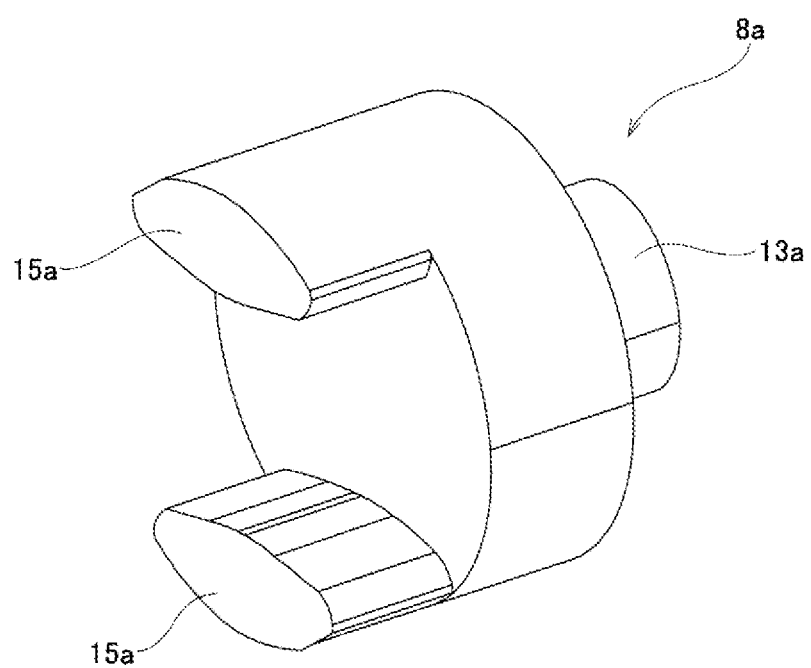
FIG. 23 is a perspective view of a part of the first rotating member of the clutch device of the second example.

As illustrated in FIG. 23, the first rotating member 8a has the first shaft portion 13a and the pair of first-rotating-member-side engaging portions 15a. The first shaft portion 13a is connected to the brake rotor 66 of the braking device 7. The pair of first-rotating-member-side engaging portions 15a is configured by convex portions extending in the axial direction from two positions on opposite sides in the diametrical direction of the tip end surface of the first shaft portion 13a.

Figure 24:
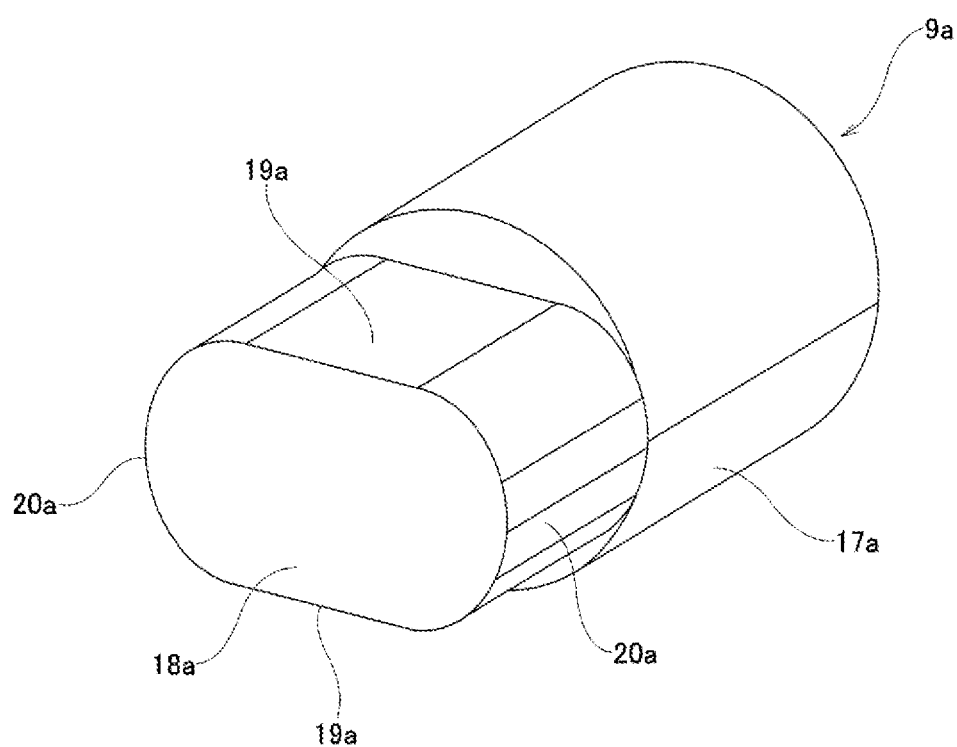
FIG. 24 is a perspective view of a part of the second rotating member of the clutch device of the second example.

The second rotating member 9a is arranged coaxially with the first rotating member 8a, and has the second shaft portion 17a and the second-rotating-member-side engaging portion 18a, as illustrated in FIG. 24. The base end portion of the second shaft portion 17a is connected to the rotating shaft 4 (see FIG. 1). The second-rotating-member-side engaging portion 18a has a substantially oval columnar shape, and extends in the axial direction from the center portion of the tip end surface of the second shaft portion 17a. The second-rotating-member-side engaging portion 18a is arranged at a portion between the pair of first-rotating-member-side engaging portions 15a.

Figure 22:
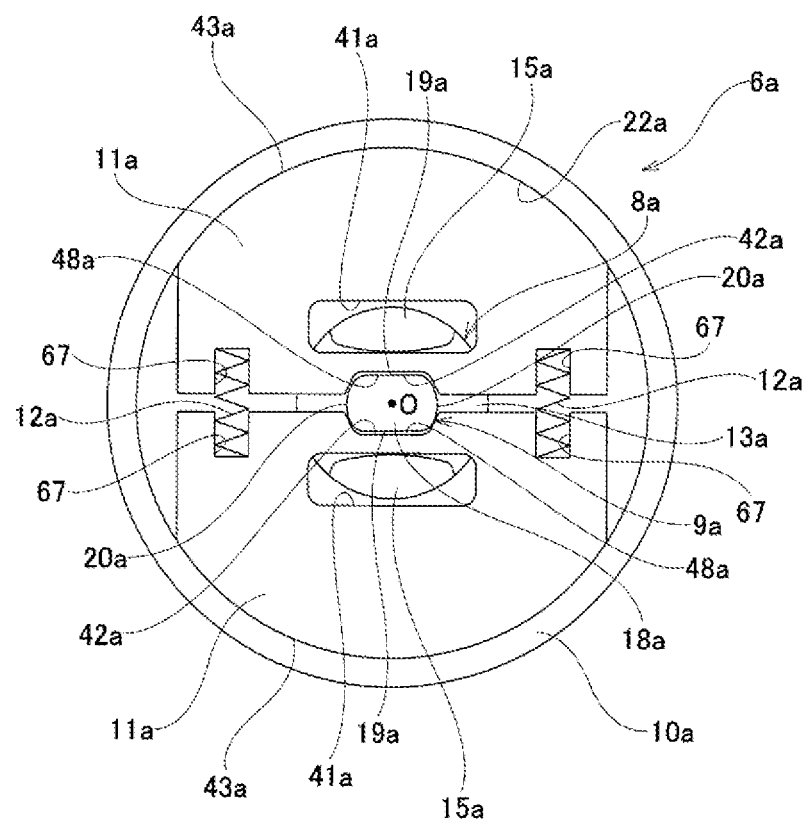
FIG. 22 is an end view of the clutch device of a rotation transmission state switching device of a second example of an embodiment of the present invention.

As illustrated in FIG. 22, the third rotating member 10a is configured in an annular shape, and is supported to the fixed portion 23 through the bearing so as to be able to rotate freely. The third rotating member 10a is arranged coaxially with the first rotating member 8a and the second rotating member 9a on the outer side in the radial direction of the pair of first-rotating-member-side engaging portions 15a and the second-rotating-member-side engaging portion 18a. The third rotating member 10a has the third-rotating-member-side engaging portion 22a, which is a cylindrical concave surface, on the inner circumferential surface thereof. In this example, the third rotating member 10a has a pulley portion having a cylindrical surface shape on the outer circumferential surface thereof.

Also in this example, the engaging element 11a is configured by the pair of engaging elements 11a that is arranged so as to sandwich the second-rotating-member-side engaging portion 18a by the respective inner side surfaces in the radial direction thereof from the outsides in the radial direction. Each of the pair of engaging elements 11a is configured in a substantially semicircular plate shape, and is arranged on the inner side in the radial direction of the third rotating member 10a. Each engaging element 11a has the engaging-element-side third engaging portion 43a, which is a partially cylindrical convex surface, on the outer side surface in the radial direction that faces the third-rotating-member-side engaging portion 22a. The radius of curvature of the engaging-element-side third engaging portion 43a is equal to or smaller than that of the third-rotating-member-side engaging portion 22a.

The inner diameter dimension of the third rotating member 10a and the radial direction dimensions of the engaging elements 11a are regulated so that in a state where the pair of engaging elements 11a is arranged on the inner side in the radial direction of the third rotating member 10a, there is a gap in at least one of a portion between the third-rotating-member-side engaging portion 22a and the engaging-element-side third engaging portions 43a, and a portion between the inner side surfaces 70 in the radial direction of the pair of engaging elements 11a.

Each engaging element 11a has the engaging-element-side first engaging portion 41a and the engaging-element-side second engaging portion 42a. The engaging-element-side first engaging portion 41a is configured by a hole that penetrates in the axial direction through the intermediate portion in the radial direction of the engaging element 11a. The engaging-element-side first engaging portion 41a has a size that allows the first-rotating-member-side engaging portion 15a to be loosely inserted. Therefore, the first-rotating-member-side engaging portion 15a can be displaced with respect to the engaging-element-side first engaging portion 41a (engaging element 11a) in the direction of rotation of the first rotating member 8a, and the engaging-element-side first engaging portion 41a (engaging element 11a) can be displaced with respect to the first-rotating-member-side engaging portion 15a in the radial direction of the engaging element 11a. The engaging-element-side second engaging portion 42a is configured by a substantially rectangular recess portion recessed outward in the radial direction from the center portion in the width direction of the inner side surface in the radial direction of the engaging element 11a. The engaging-element-side second engaging portion 42a has a size that allows the front half portion in the minor axis direction of the second-rotating-member-side engaging portion 18a to be arranged on the inner side thereof.

Each engaging element 11a has substantially rectangular recess portions 67 recessed outward in the radial direction from both side portions in the width direction of the inner side surface in the radial direction.

In this example, the biasing member 12a is configured by the pair of biasing members 12a that is arranged between both side portions in the width direction of the inner side surfaces in the radial direction of the pair of engaging elements 11a. Each end portion of each biasing member 12a is inserted into each recess portion 67 of each of the pair of engaging elements 11a.

In the assembled state of the clutch device 6a of this example, the pair of first-rotating-member-side engaging portions 15a of the first rotating member 8a arranged on the one side in the axial direction is inserted in the axial direction through the engaging-element-side first engaging portions 41a of the pair of engaging elements 11a, and the second-rotating-member-side engaging portion 18a of the second rotating member 9a arranged on the other side in the axial direction is inserted in the axial direction between the pair of engaging element-side second engaging portions 42a. That is, the pair of engaging elements 11a is arranged so that the respective engaging-element-side second engaging portions 42a sandwich the second-rotating-member-side engaging portion 18a from the outsides in the radial direction.

<Drive Mode>

Figure 25:
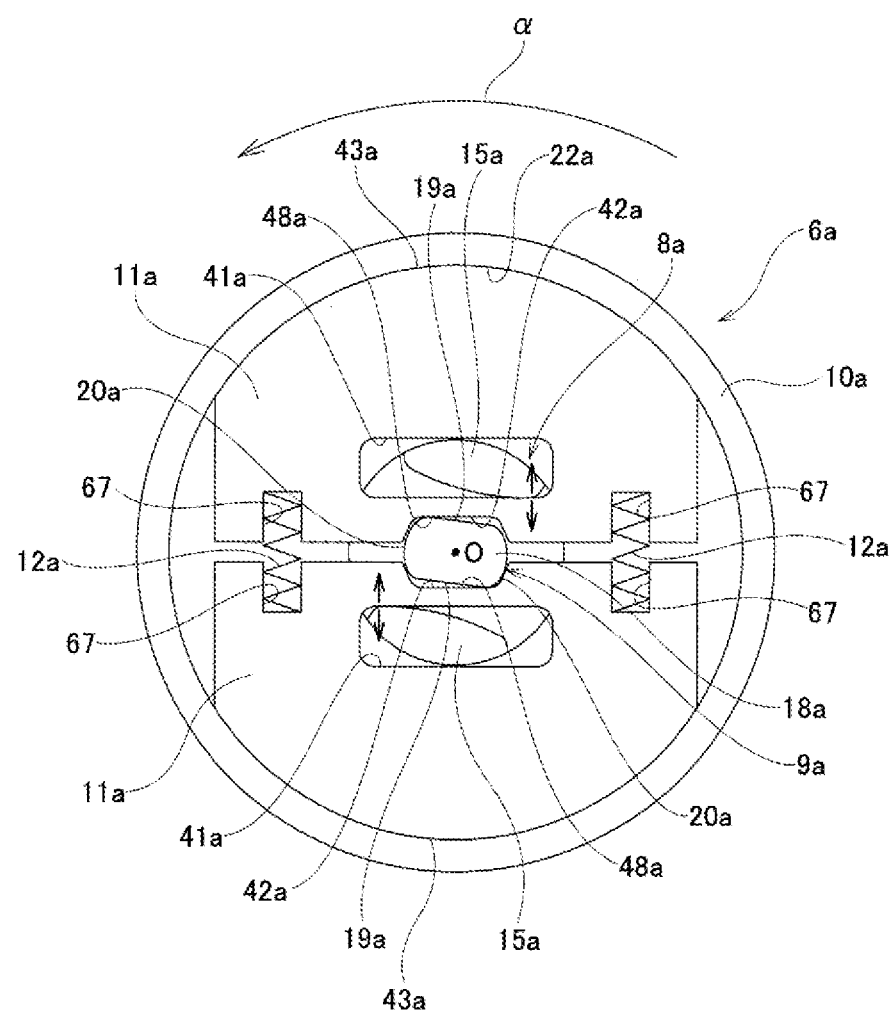
FIG. 25 is an end view of the clutch device of the second example in a state where torque is inputted to the third rotating member.

In the drive mode in which braking of the first rotating member 8a by the braking device 7 is released, by rotating the output shaft 2 of the drive source 1 (see FIG. 1), torque is inputted to the third rotating member 10a through a belt laid between the output shaft 2 and the pulley portion provided on the outer circumferential surface of the third rotating member 10a, and then the third rotating member 10a and the pair of engaging elements 11a integrally rotate around the center axis O of the clutch device 6a, as indicated by an arrow a in FIG. 25. That is, the engaging elements 11a are pressed in directions toward the third-rotating-member-side engaging portion 22a by the pair of biasing members 12a, and the third-rotating-member-side engaging portion 22a and the engaging-element-side third engaging portions 43a are kept in a state of frictionally engaging with each other, so that the pair of engaging elements 11a also rotates according to the rotation of the third rotating member 10a.

As the third rotating member 10a and the pair of engaging elements 11a rotate, as illustrated in FIG. 25, the corner portions which are the connecting portions between the side surfaces 19a and the guiding surfaces 20a of the second-rotating-member-side engaging portion 18a are pressed by the bottom surfaces 48a of the engaging-element-side second engaging portions 42a in the circumferential direction. Due to this, the second rotating member 9a receives a force that would make the second rotating member 9a rotate. At this time, reaction forces that press the engaging elements 11a outward in the radial direction are applied to the bottom surfaces 48a of the engaging-element-side second engaging portions 42a from the corner portions which are the connecting portions between the side surfaces 19a and the guiding surfaces 20a of the second-rotating-member-side engaging portion 18a. As a result, frictional forces that act on the contact portions between the third-rotating-member-side engaging portion 22a and the engaging-element-side third engaging portions 43a increase, thereby preventing sliding in the contact portions from occurring.

When the pair of engaging elements 11a rotates, the first-rotating-member-side engaging portions 15a are pushed in the circumferential direction by the engaging-element-side first engaging portions 41a, and thus the first rotating member 8a receives a force that would make the first rotating member 8a rotate. In the drive mode, because braking of the first rotating member 8a by the braking device 7 has been released to allow rotation of the first rotating member 8a with respect to the fixed portion 23, when the first-rotating-member-side engaging portions 15a of the first rotating member 8a are pushed in the circumferential direction, the first rotating member 8a rotates around the center axis O. As a result, the first rotating member 8a, the second rotating member 9a, the third rotating member 10a, and the pair of engaging elements 11a integrally rotate. In other words, the entire clutch device 6a integrally rotates. In this way, in the drive mode, torque transmission from the third rotating member 10a to the second rotating member 9a is allowed.

Figure 26:
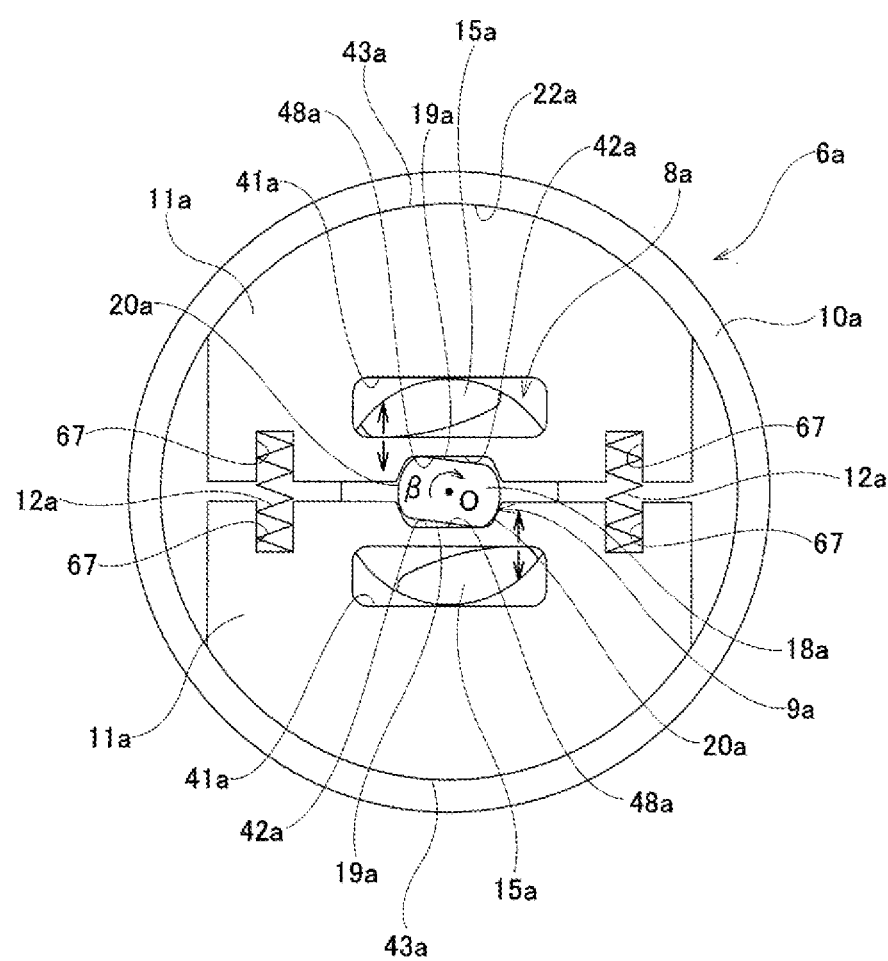
FIG. 26 is an end view of the clutch device of the second example in a state where torque is inputted to the second rotating member.

In the drive mode, when torque is applied to the second rotating member 9a from a road surface through the drive wheels, as indicated by an arrow 13 in FIG. 26, the second-rotating-member-side engaging portion 18a rotates around the center axis O inside the pair of engaging elements 11a. Then, the corner portions which are the connecting portions between the side surfaces 19a and the guiding surfaces 20a of the second-rotating-member-side engaging portion 18a press the bottom surfaces 48a of the engaging-element-side second engaging portions 42a in the circumferential direction. Due to this, the pair of engaging elements 11a is pressed outward in the radial direction, and rotates around the center axis O. As the pair of engaging elements 11a is pressed outward in the radial direction, the engaging-element-side third engaging portions 43a are pressed against the third-rotating-member-side engaging portion 22a, and then the third-rotating-member-side engaging portion 22a and the engaging-element-side third engaging portions 43a frictionally engage with each other. In the drive mode, because rotation of the first rotating member 8a is allowed, when the pair of engaging elements 11a rotates around the center axis O, the third rotating member 10a also rotates around the center axis O due to the frictional engagement between the third-rotating-member-side engaging portion 22a and the engaging-element-side third engaging portions 43a. In this way, torque inputted to the second rotating member 9a is transmitted to the third rotating member 10a.

<Neutral Mode>

In the neutral mode in which rotation of the first rotating member 8a is prevented by the braking device 7, when the output shaft 2 is rotated by the drive source 1, torque is inputted to the third rotating member 10a, and then the third rotating member 10a and the pair of engaging elements 11a tend to integrally rotate around the center axis O, as indicated by an arrow a in FIG. 25.

When the pair of engaging elements 11a tends to rotate, the first-rotating-member-side engaging portions 15a are pushed in the circumferential direction by the engaging-element-side first engaging portions 41a, and thus the first rotating member 8a receives a force that would make the first rotating member 8a rotate. In the neutral mode, because the first rotating member 8a is braked by the braking device 7, rotation of the first rotating member 8a with respect to the fixed portion 23 is prevented. Due to this, when the first-rotating-member-side engaging portions 15a are pressed in the circumferential direction by the engaging-element-side first engaging portions 41a, reaction forces that press inner side surfaces in the radial direction of the engaging-element-side first engaging portions 41a inward in the radial direction are applied to the engaging-element-side first engaging portions 41a from the first-rotating-member-side engaging portions 15a. As a result, the engaging elements 11a slightly move in directions away from the third-rotating-member-side engaging portion 22a, that is, inward in the radial direction, and thus the surface pressure at the contact portions between the engaging-element-side third engaging portions 43a and the third-rotating-member-side engaging portion 22a is reduced or lost. Due to this, the third rotating member 10a tends to idle or slide with respect to the engaging element 11a. In this way, in the neutral mode, torque transmission between the gear portion 21 and the second shaft portion 17a is not possible.

In the neutral mode, when torque is applied from the road surface to the second rotating member 9a through the drive wheels, as indicated by an arrow 13 in FIG. 26, the second-rotating-member-side engaging portion 18a rotates around the center axis O on the inner side between the pair of engaging elements 11a. Then, the corner portions which are the connecting portions between the side surfaces 19a and the guiding surfaces 20a of the second-rotating-member-side engaging portion 18a press the bottom surfaces 48a of the engaging-element-side second engaging portions 42a in the circumferential direction. Due to this, the pair of engaging elements 11a are pressed outward in the radial direction, and tend to rotate around the center axis O, so that the first-rotating-member-side engaging portions 15 are pressed in the circumferential direction by the engaging-element-side first engaging portions 41a. In the neutral mode, because rotation of the first rotating member 8a is prevented, when the first-rotating-member-side engaging portions 15a are pressed in the circumferential direction by the engaging-element-side first engaging portions 41a, reaction forces are applied to the engaging-element-side first engaging portions 41a from the first-rotating-member-side engaging portions 15a in directions in which the engaging elements 11a move away from the third-rotating-member-side engaging portion 22a. As a result, the pair of engaging elements 11a tend to slightly move in directions away from the third-rotating-member-side engaging portion 22a, and thus the surface pressure at the contact portions between the engaging-element-side third engaging portions 43a and the third-rotating-member-side engaging portion 22a is reduced or lost. In this way, torque inputted to the second rotating member 9a is not able to be transmitted to the third rotating member 10a.

Also in this example, in the neutral mode, because rotation of the first rotating member 8a is prevented by the braking device 7, even when forces that would press the first-rotating-member-side engaging portions 15a in the circumferential direction are applied from the engaging elements 11a to the first-rotating-member-side engaging portions 15a, rotation of the engaging elements 11a is prevented. As a result, rotation of the second rotating member 9a is also prevented, and thus rotation of the drive wheels can be prevented. In other words, functions as a parking brake can be exhibited.

The clutch device 6a of this example can be configured more simply than the clutch device 6 of the first example, thereby suppressing the cost. The other configurations and functional effects are the same as in the first example.

Third Example

Figure 27:
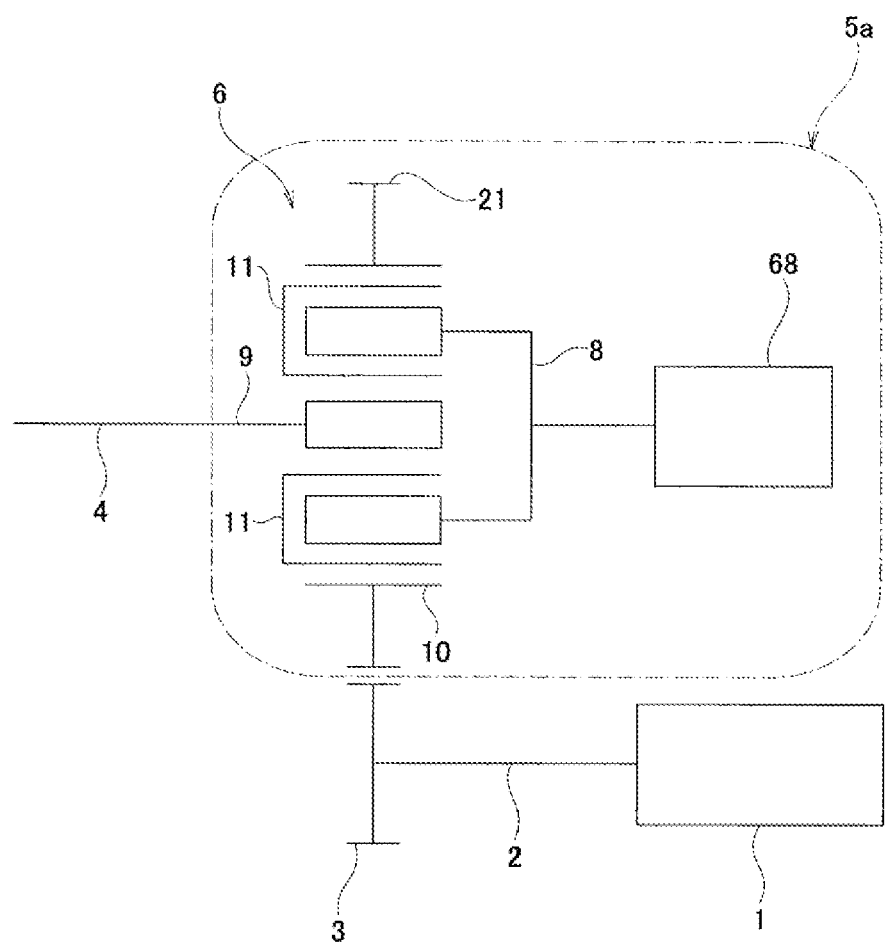
FIG. 27 is a schematic view illustrating a drive system for automobiles in which a rotation transmission state switching device of a third example of an embodiment of the present invention is incorporated.

The third example of an embodiment of the present invention will be described with reference to FIG. 27. In the rotation transmission state switching device 5a of this example, an electric motor 68 is used as a restriction device for performing switching so that it is possible or not possible for the first rotating member 8 of the clutch device 6 to rotate. That is, an electrical energization to the electric motor 68 is controlled to switch between a state where rotation of the first rotating member 8 is allowed and a state where rotation of the first rotating member 8 is restricted (prevented).

In the rotation transmission state switching device 5a of this example, in the drive mode where torque transmission between the output shaft 2 of the drive source 1 and the rotating shaft 4 is allowed, an electrical energization to the electric motor 68 is controlled to make torque applied to the first rotating member 8 by the electric motor 68 zero or small, thereby allowing rotation of the first rotating member 8. On the other hand, in the neutral mode where torque transmission between the output shaft 2 of the drive source 1 and the rotating shaft 4 is not possible, an electrical energization to the electric motor 68 is controlled to make torque applied to the first rotating member 8 by the electric motor 68 large, thereby restricting rotation of the first rotating member 8. The other configurations and functional effects are the same as in the first example.

Fourth Example

Figure 28:
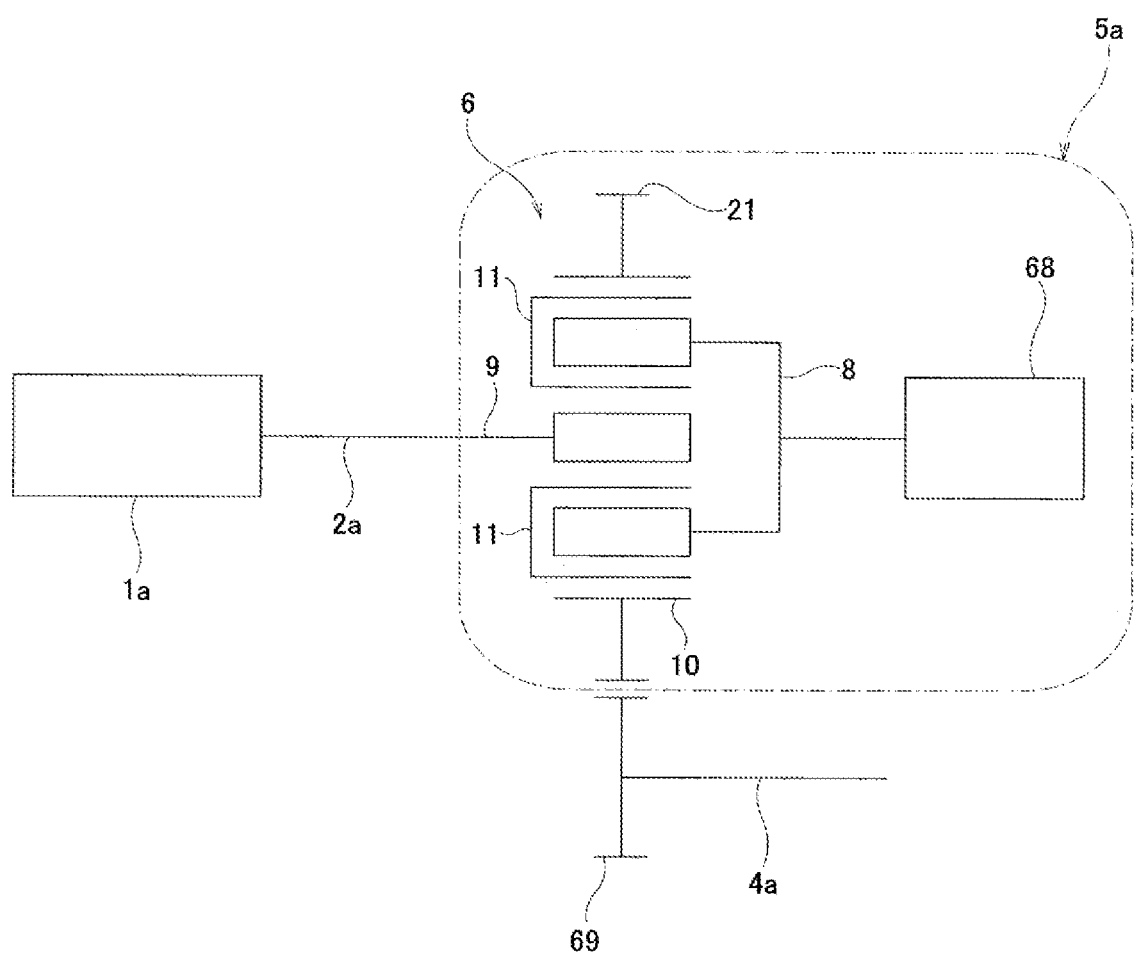
FIG. 28 is a schematic view illustrating a drive system for automobiles in which a rotation transmission state switching device of a fourth example of an embodiment of the present invention is incorporated.

The fourth example of an embodiment of the present invention will be described with reference to FIG. 28. In this example, the second rotating member 9 is arranged on the side of the drive source 1a, and the third rotating member 10 is arranged on the side of the drive wheels. That is, the second shaft portion 17 of the second rotating member 9 (see FIGS. 2, 4, 5 and the like) is integrally formed with the output shaft 2a of the drive source 1a at the end portion on one side in the axial direction of the output shaft 2a, or is coupled and fixed to the end portion on the one side in the axial direction of the output shaft 2a. In addition, the gear portion 21 of the third rotating member 10 is meshed with a driven-side gear 69 provided on the rotating shaft 4a connected to the drive wheels so that torque transmission is possible.

In this example, by controlling electrical energization to the electric motor 68 to make torque applied to the first rotating member 8 by the electric motor 68 zero or small, rotation of the first rotating member 8 is allowed, thereby switching to the drive mode in which torque transmission between the output shaft 2a of the drive source 1a and the rotating shaft 4a is allowed. On the other hand, an electrical energization to the electric motor 68 is controlled to make torque applied to the first rotating member 8 by the electric motor 68 large, thereby switching to the neutral mode in which torque transmission between the output shaft 2a of the drive source 1a and the rotating shaft 4a is not possible. The other configurations and functional effects are the same as in the first example and the third example.

REFERENCE SIGNS LIST 1, 1a Drive source
2, 2a Output shaft
3 Drive-side gear
4, 4a Rotating shaft
5, 5a Rotation transmission state switching device
6, 6a Clutch device
7 Braking device
8, 8a, 8z First rotating member
9, 9a Second rotating member
10, 10a Third rotating member
11, 11a, 11z Engaging element
12, 12a Biasing member
13, 13a First shaft portion
14 Arm portion 15, 15a, 15z First-rotating-member-side engaging portion
16 Support hole
17, 17a Second shaft portion
18, 18a Second-rotating-member-side engaging portion
19, 19a Side surface
20, 20a Guiding surface
21 Gear portion
22, 22a Third-rotating-member-side engaging portion
23 Fixed portion
24 Main body
25 Lid body
26 Bolt
27 Outer-diameter-side cylinder portion
128 Inner-diameter-side cylinder portion
29 Side plate portion
30 Main-body-side faucet fitting surface
31 Screw hole
32 Main-body-side bearing fitting surface
33 Outer-diameter-side cylinder portion
34 Inner-diameter-side cylinder portion
35 Side plate portion
36 Lid-body-side faucet fitting surface
37 Through hole
38 Lid-body-side bearing fitting surface
39 Lid-body-side bearing
40 Main-body-side bearing
41, 41a, 41z Engaging-element-side first engaging portion
42, 42a Engaging-element-side second engaging portion
43, 43a Engaging-element-side third engaging portion
44 Engaging element main body
45 Link member
46 Swinging support shaft
47 Internal space
48 Bottom surface
49 Guided surface
50 Insertion hole
51 Convex portion
52 Main body plate
53 Intermediate plate
54 Bolt
55 Nut
56 Convex surface
57 Support hole
58 Plate-side engaging portion
59 Through hole
60 Through hole
61 Positioning hole
62 Through hole
63 Positioning hole
64 Swinging supported member
65 Brake caliper
66 Brake rotor
67 Recess portion
68 Electric motor
69 Driven-side gear

The invention claimed is:

1. A rotation transmission state switching device comprising:
a clutch device; and a restriction device;
the clutch device comprising:
a first rotating member having a first-rotating-member-side engaging portion;
a second rotating member having a second-rotating-member-side engaging portion arranged on an inside in a radial direction of the first-rotating-member-side engaging portion;
a third rotating member having a third-rotating-member-side engaging portion on an inner circumferential surface thereof;
an engaging element having an engaging-element-side first engaging portion that engages with the first-rotating-member-side engaging portion, an engaging-element-side second engaging portion that is provided on an inner side surface in the radial direction thereof and engages with the second-rotating-member-side engaging portion, and an engaging-element-side third engaging portion that is provided on an outer side surface in the radial direction thereof and engages with the third-rotating-member-side engaging portion; and
a biasing member configured to elastically bias the engaging element in a direction in which the third-rotating-member-side engaging portion and the engaging-element-side third engaging portion engage with each other;
the first-rotating-member-side engaging portion is arranged on an inside in the radial direction of the third-rotating-member-side engaging portion, and the second-rotating-member-side engaging portion is arranged on the inside in the radial direction of the third-rotating-member-side engaging portion;
the restriction device being configured so as to be able to switch between a state where rotation of the first rotating member is allowed and a state where rotation of the first rotating member is restricted; and
torque transmission between the second rotating member and the third rotating member being allowed by integrally rotating the first rotating member, the second rotating member, the third rotating member, and the engaging element when torque is inputted to the third rotating member in a state where rotation of the first rotating member is allowed by the restriction device, whereas torque transmission between the second rotating member and the third rotating member is not possible by the engaging-element-side third engaging portion of the engaging element moving in a direction away from the third-rotating-member-side engaging portion based on engagement between the engaging-element-side first engaging portion and the first-rotating-member-side engaging portion, and thus by surface pressure at a contact portion between the engaging-element-side third engaging portion and the third-rotating-member-side engaging portion being reduced or lost, when torque is inputted to the third rotating member in a state where rotation of the first rotating member is prevented by the restriction device.

2. The rotation transmission state switching device according to claim 1, wherein
the restriction device is configured by a braking device provided between a fixed portion that does not rotate even in use and the first rotating member, the braking device switching between a state where rotation of the first rotating member with respect to the fixed portion is allowed and a state where rotation of the first rotating member with respect to the fixed portion is prevented.

3. The rotation transmission state switching device according to claim 1, wherein
the engaging element is configured by a pair of engaging elements arranged so as to sandwich the second-rotating-member-side engaging portion by inner side surfaces in the radial direction thereof from outsides in the radial direction.

4. The rotation transmission state switching device according to claim 1, wherein the engaging element comprises:

an engaging element main body having the engaging-element-side second engaging portion, the engaging-element-side third engaging portion, and a swinging support portion positioned closer to the third-rotating-member-side engaging portion than the engaging-element-side first engaging portion with respect to a direction of movement of the engaging-element-side third engaging portion toward or away from the third-rotating-member-side engaging portion; and a link member having the engaging-element-side first engaging portion, and a swinging supported member supported by the swinging support portion so as to be able to swing.

5. The rotation transmission state switching device according to claim 4, wherein the engaging element main body comprises:

a pair of main body plates respectively having a plate-side engaging portion configuring the engaging-element-side second engaging portion, arranged so as to overlap each other with respect to an axial direction of the third-rotating-member-side engaging portion, and connected to each other; and a swinging support shaft constituting the swinging support portion, and supported by the pair of main body plates on both side portions in the axial direction thereof;

the link member being arranged between the pair of main body plates.

6. The rotation transmission state switching device according to claim 5, wherein the engaging element main body includes an intermediate plate sandwiched and held between the pair of main body plates.

7. The rotation transmission state switching device according to claim 1, wherein the third rotating member has a torque input/output portion on an outer circumferential surface thereof.

8. The rotation transmission state switching device according to claim 1, which is used by being incorporated in a drive system in which rotation torque of the drive source is transmitted to a drive wheel.

\* \* \* \* \*